United States Patent [19]
Yoshizawa et al.

[11] Patent Number: 5,734,899
[45] Date of Patent: Mar. 31, 1998

[54] DEVICE FOR MANAGING DATA IN A VERSION

[75] Inventors: Naomi Yoshizawa; Hiroshi Ishikawa, both of Kawasaki, Japan

[73] Assignee: Fujitsu Limited, Kawasaki, Japan

[21] Appl. No.: 640,432

[22] Filed: Apr. 30, 1996

Related U.S. Application Data

[63] Continuation of Ser. No. 346,280, Nov. 22, 1994, abandoned.

[30] Foreign Application Priority Data

Nov. 26, 1993 [JP] Japan ................................ 5-296322

[51] Int. Cl.⁶ .................................................... G06F 17/30
[52] U.S. Cl. .......................... 395/619; 395/614; 395/346
[58] Field of Search ................................. 395/600, 614, 395/619, 346

[56] References Cited

U.S. PATENT DOCUMENTS

| | | | |
|---|---|---|---|
| 4,627,019 | 12/1986 | Ng | 395/425 |
| 5,278,979 | 1/1994 | Foster et al. | 395/600 |
| 5,317,731 | 5/1994 | Dias et al. | 395/600 |
| 5,335,341 | 8/1994 | Chana | 395/575 |
| 5,386,559 | 1/1995 | Eisenberg et al. | 395/600 |
| 5,438,661 | 8/1995 | Ogawa | 395/157 |
| 5,452,239 | 9/1995 | Dai et al. | 364/578 |
| 5,499,365 | 3/1996 | Anderson et al. | 395/600 |

OTHER PUBLICATIONS

Beech et al. "Generalized Version Control in an Object-Oriented Database." IEEE, pp. 14–22, 1988.

Hardwick et al. "The Rose Data Manager: Using Object Technology to Support Interactive Engineering Application", IEEE, pp. 285–289, Jun. 1989.

Chou et al. "Version and change notification in an object-oriented database System", IEEE, pp. 275–280.

Kitagawa et al.; "Design data modeling with versioned conceptual configuration."; IEEE; pp. 225–233.

Edward Yourdon, "Java, the Web, and Software Development", IEEE, vol. 29, pp. 25–30, Aug. 1996.

Miriam A.M. Capretz et al., "The Object-Oriented Paradigm for Software Evolution", IEEE, pp. 23–28, 1994.

Moon Jung Chung and Sangchul Kim, "The Configuration Management for Version Control in an Object-Oriented VHDL Design Environment", IEEE, pp. 258–261, 1991.

Ying Yang, "A Metaobject-Based Version Control Mechanism in Software Object Databases", IEEE, pp. 120–125, 1991.

CV. Ramamoorthy et al., "The Evolution Support Environment System", IEEE Transactions On Software Engineering, vol. 16, pp. 1225–1234, Nov. 1990.

*Primary Examiner*—Thomas G. Black
*Assistant Examiner*—Cheryl R. Lewis
*Attorney, Agent, or Firm*—Staas & Halsey

[57] ABSTRACT

A version control device comprises an entire-generic information storage object for storing version control information common to data under the application of a version control, version-generic information storage objects which are managed by the entire-generic information storage object and stores version control information corresponding to each piece of the data and common to all versions of the data, and version-specific information storage objects which are managed by one of the version-generic information storage object and stores version control information corresponding to each of the versions of the data and specific to each version.

19 Claims, 20 Drawing Sheets

DEVICE FOR MANAGING DATA IN A VERSION

This application is a continuation of application Ser. No. 08/346,280, filed Nov. 22, 1994 now abandoned.

BACKGROUND OF THE INVENTION

1. Field of the Invention

The present invention relates to a data management system for storing and managing data and programs, for example, a data base system, and more specifically to a version control device and method for managing data in a version created by modifying a part of original data.

2. Description of the Related Art

The concept of version of data and programs has been introduced to a number of systems and applied for practical use in many fields. However, the functions of these systems are to add version information to original data, incorporate the version information into the original data, and control them collectively.

Accordingly, it has been very difficult to add version control capabilities to a system not currently provided with the function of controlling a version. Furthermore, realizing version control greatly depends on the configuration of a system and therefore undesirably refuses user customization of the system.

In conventional systems, two concepts have been accepted separately for the version control. One is applied to represent alternatives, and the other is to represent revisions (derivatives).

SUMMARY OF THE INVENTION

The present invention aims to combine the two above described concepts of selecting a version, manage data in a plurality of versions through a single managing operation without consideration of a difference between the two concepts, and enable a system not originally capable of managing data in a plurality of versions to additively manage them successfully.

The present invention relates to a device and a method of controlling data versions in an object-oriented data base. According to the present invention, the data base separately stores data and version control information about a plurality of versions, and the version control information is divided into plural pieces of hierarchically structured control information.

For example, the version control information can be composed of three-layered control information, that is, an entire-generic information storage object, a plurality of version-generic information storage objects, and a plurality of version-specific information storage objects.

The entire-generic information storage object contains the information common to all data. The version-generic information storage object contains the information common to all versions of specific data. The version-specific information storage object contains the information specific to each version.

The entire-generic information storage object manages a plurality of version-generic information storage objects corresponding to various data. Each version-generic information storage object manages a plurality of version-specific information storage objects corresponding to a plurality of versions of data.

The number of layers of the version control information is not limited to 3, but can be incremented or decremented if necessary. For example, linking a plurality of version-generic information storage objects enables the entire-generic information storage object managing them to be omitted and the versions can be controlled according to two-layered version control information. Furthermore, a four-layer version control information can be used by adding user-generic information storage objects containing information common to the data commonly used by each user.

In the version control device according to the present invention, since managed data and their version control information are processed independently, the same version control function can be applied to the objects of different types such as schema, class, instance, etc. The versions of these objects are managed by a single entire-generic information storage object through a version-generic information storage object and a version-specific information storage object.

The version-specific information storage object stores a parent-child relationship of versions indicating which version of specific data has created another version. Therefore, a user need not memorize the parent version of a newly created version.

The version control device according to the present invention is provided with an consistency maintaining mechanism for checking before changing a piece of data whether or not the change affects the consistency between the resultant data and other data. If the change of the data affects the consistency between them and the other data, the consistency maintaining mechanism does not accept the change until the consistency is assured.

Another method of maintaining the consistency of data is to change data first and then change other data in accordance with the change at a timing predetermined by the system. If the data are checked for consistency by a checker operated at the timing and are found to be inconsistent among themselves, then the system tries to restore the entire data to a consistent state.

The entire-generic information storage object also manages a list of versions of data at respective time as environment information. The version control device refers to the environment information to regenerate the data environment at an optional time in the past.

For proper management, the version control device distinguishes the data under the application of the version control function from those without the application of the function. One of versions of data under the application of the version control function can be immediately set to be an operation object if it is maintained as a type of data before the application of the version control function.

DETAILED DESCRIPTION OF THE PREFERRED EMBODIMENTS

The preferred embodiments of the present invention are explained in detail by referring to the attached drawings.

Figure 1:
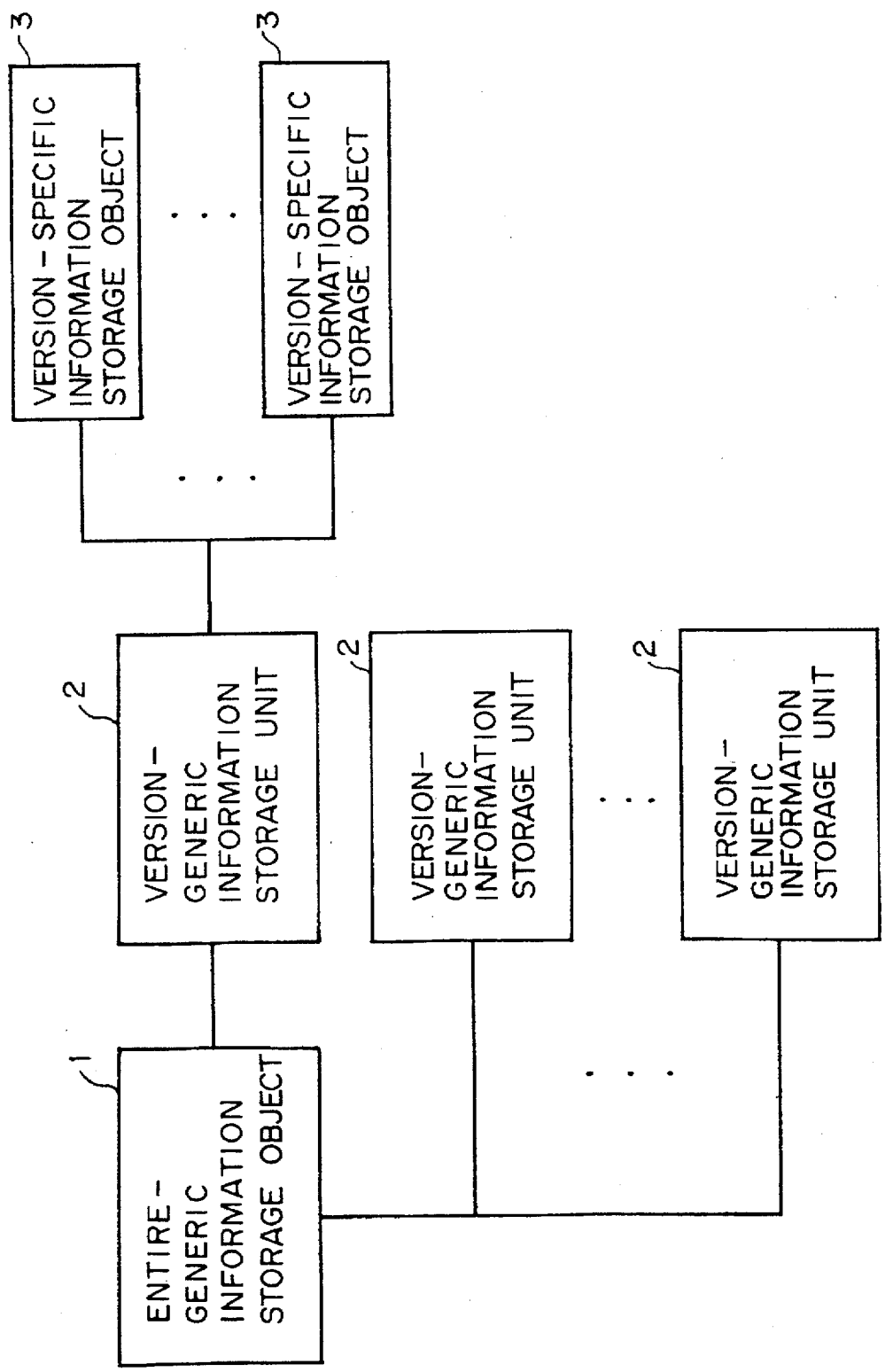
FIG. 1 shows the configuration of version control information data.

FIG. 1 shows the structure of the version control information data according to the present invention. The data structure shown in FIG. 1 shows an example of data for version control in an object-oriented data base system capable of storing and processing object oriented data.

In FIG. 1, an entire-generic information storage object 1 is, for example, an object of a version control class, and stores and manages the version control information common to all object-oriented data under the application of a version control function.

A version-generic information storage object 2 is an object managed by the entire-generic information storage object 1 and stores and manages the version control information common to all versions for each of a plurality of object-oriented data under the application of a version control function. It can be, for example, a historical class object.

A version-specific information storage object 3 is managed by the version-generic information storage object 2 and stores and manages the version control information specific to each version corresponding to each of a plurality of versions of object-oriented data. It can be, for example an object of a version class.

According to the present invention, a plurality of versions of object-oriented data A under the application of a version control function are assigned respective numbers A[1], A[2], A[3], ... in the order of creation.

The version information specific to each version A[n]; of object A is stored in the version-specific information storage object 3, for example, in object V[An] of a version class. The specific version control information contains information, e.g. as to which is the parent or child version of the present version.

The version control information common to all versions A[1], A[2], A[3], ... of object A is stored in the version-generic information storage object 2, for example in object H[A] of a historical class. The stored information is the owner of object A, the creation time of the first version of object A, etc.

The version-generic information storage object 2, for example, H[A], H[B], H[C], ... are provided for each of a plurality of object-oriented data A, B, C, ... respectively, and these objects manage the version-specific information storage objects 3 corresponding to a plurality of versions of each object.

Objects H[A], H[B], H[C], ... of a historical class are managed by the entire-generic information storage object 1, for example, object Vc of a version control class. The object stores the version control information common to all object-oriented data A, B, C, ... under the application of a version control function, and thus all object-oriented data are managed.

As mentioned above, the version control information is stored independently of the data to be managed, and the version control information is managed after being divided into three layers of objects, thereby effectively performing various processes.

Figure 2:
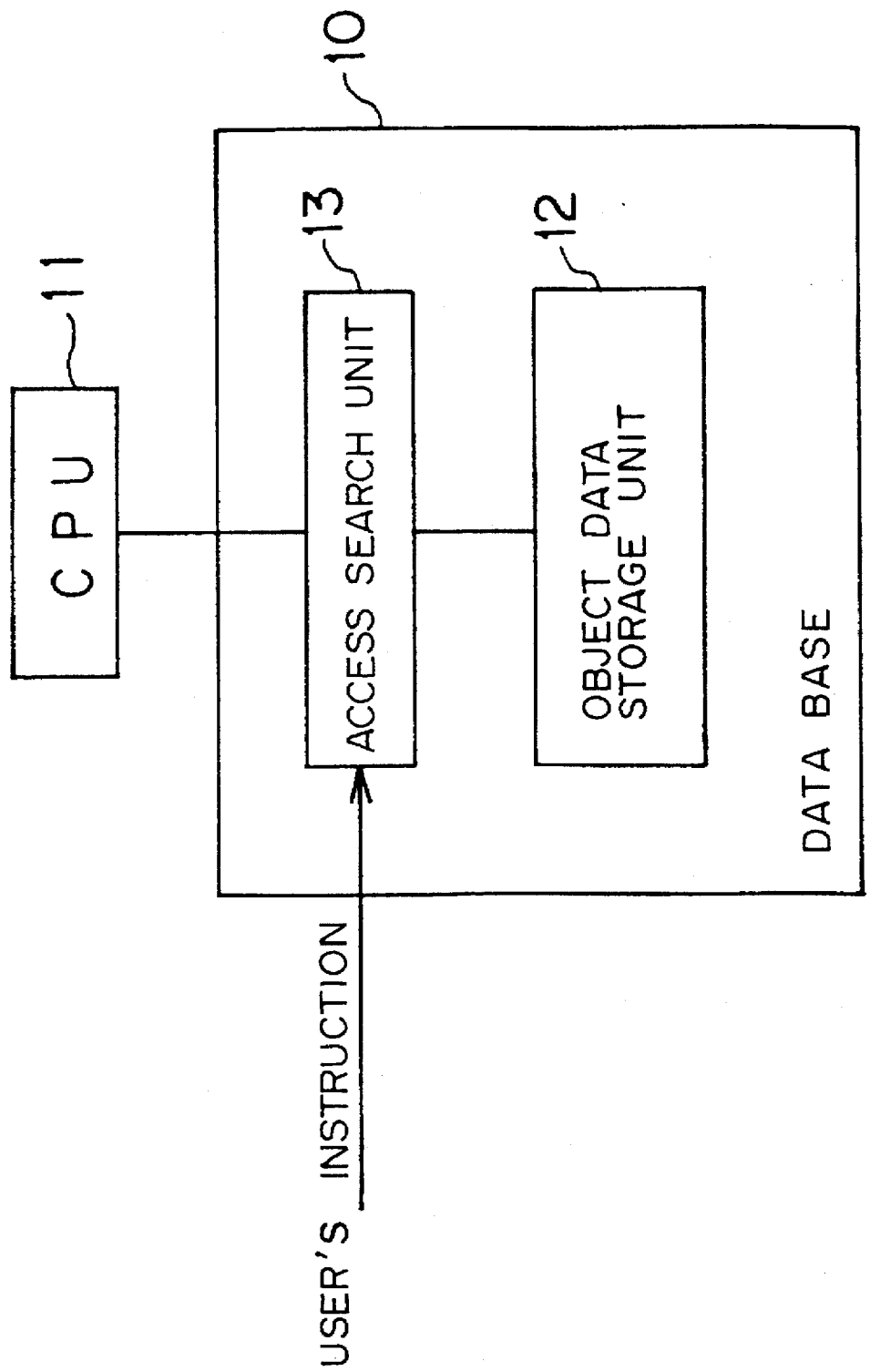
FIG. 2 is a block diagram showing the entire configuration of the object-oriented data base system operated by the version control method according to the present invention.

FIG. 2 is a block diagram of the general configuration of the object-oriented data base system (OODB), which is the version control device for storing the version control information shown in FIG. 1. The system shown in FIG. 2 comprises a data base 10 and a CPU 11 for processing data.

The data base 10 comprises an object data storage unit 12 for storing, as objects, the version control information specific to the present invention, data under the application of a version control function, and data without the application of the version control function, and an access search unit 13 for accessing data in the object data storage unit 12 at an instruction of a user or the CPU 11 to search the data. The access search unit 13 can be regarded as a unit having one of functions of the CPU 11.

In the present invention, the information required by the version control function is divided into three types, that is, ① information about all objects in an object group to be under the application of the version control function, ② information specific to the data which are application units of the version control function, and ③ information related to one specified version of each application unit of data. An object for storing the information is newly defined by a system requesting the version control function. By providing a function of operating the stored information, the version control function can be additively provided, and various user definitions relating to version operations can be easily added to it. The procedures for easily adding the definitions are described later.

Figure 3:
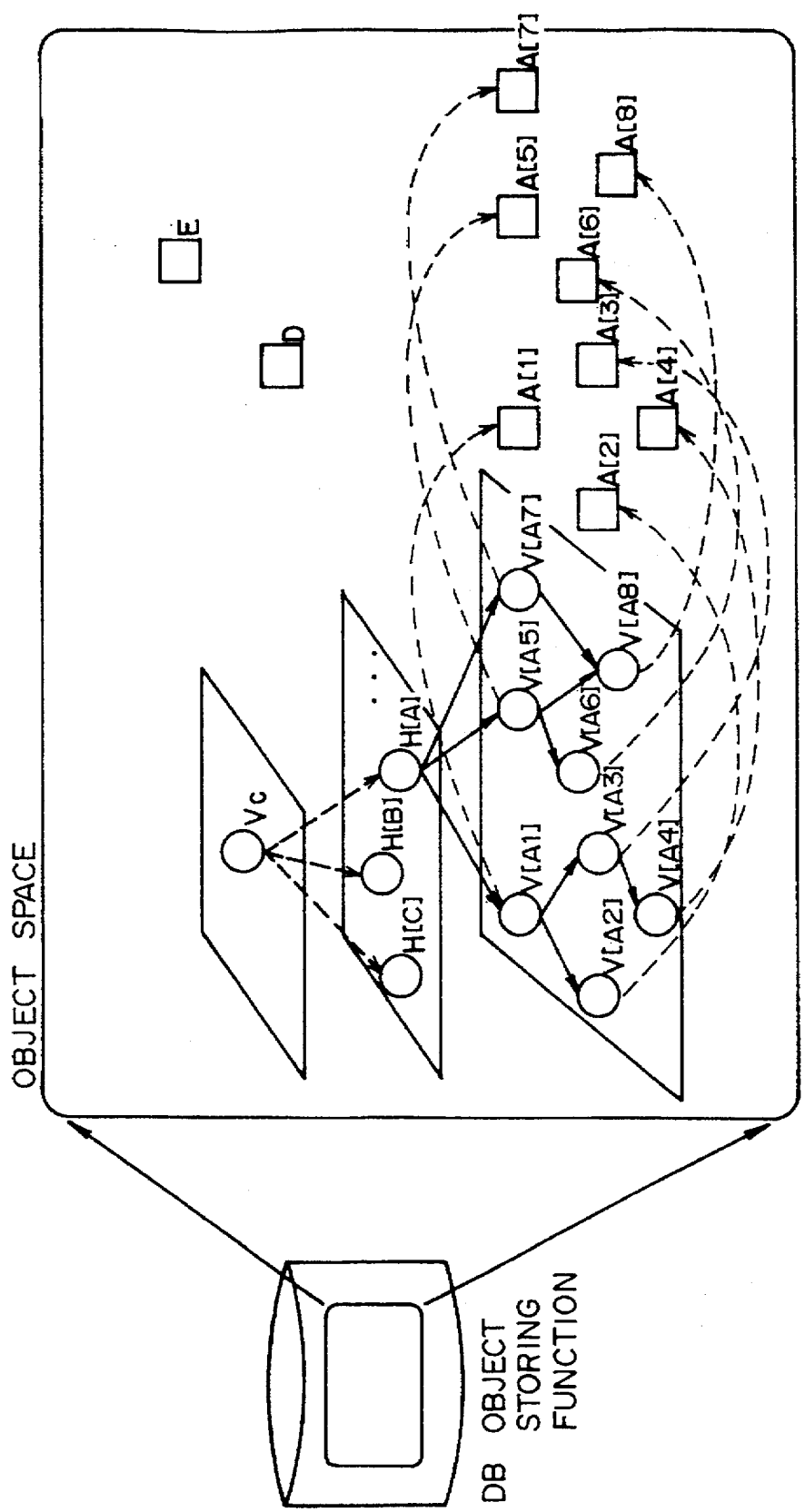
FIG. 3 shows a form of the version control information storage objects and the data object in a data base.

The two functions included in the concept of version, that is, selecting a version from alternatives and selecting one of revisions can be performed by a single version managing mechanism by structuring the above described objects and the data processed by the version control function as shown in FIG. 3, and especially by structuring a lattice of objects, for example, V[An] each storing the information about only one specific version of an object under the application of the version control function.

A plurality of objects of the same name cannot exist in the system before the application of the version control function. Therefore, if an object A is to be processed by the version control function, then the object is converted into an appropriate form (by various methods, e.g. by only renaming it, by compressing it for transformation into another format, etc.) and is assigned a different name such as A[1], A[2], A[3], ....

The version information about each object A[n] is stored in V[An] for storing information related to a specified version of an object to be under the application of the version control function according to the present invention. The information stored in V[An] can be, for example, a list of parent objects of A[n] (an existing version of A if A[n] is created by modifying the existing version), a list of child objects of A[n] (a newly created version of object A if the version is created by modifying A[n]), etc. V[An] is assumed to contain information which can specify A[n].

Furthermore, H[A], that is, an object for storing the information specific to the data under the application of the version control function, is provided to store the information common to A[1], A[2], . . . The stored information can be, for example, the owner of object A, the creation time of object A, etc. Information V[A1], V[A2], V[A3], . . . about previously used objects, that is, old versions, are also managed in H[A].

As described above, H[o] of the number of objects being under the application of the version control function in an object group are created. The series of objects H[o] are managed in object Vc for storing the information related to all objects in an object group under the application of the version control function.

FIG. 3 shows the above described relationship of management. In FIG. 3, object A3 is created by partially modifying object A1, and A4 is created by partially modifying A5. They are created in time series as new versions of old version A1. On the other hand, for example, A5 and A7 are created independently of A1, and are not referred to as new versions of A1, but to selections or alternatives from original data. Thus, according to the present invention, the different concepts of versions can be processed integrally by a single version managing mechanism.

Thus, data can be manipulated in various processes by storing version-related information and data independently and by managing the information after dividing it into three levels.

Described below are the configuration of objects when the version control function is implemented in an actual object-oriented data base (hereinafter referred to as OODB), and the data object operating procedure to be modified in accordance with the implementation.

First, each object is assigned a class name as described below. Version Control is a class name of an object for use in storing ① information about all objects in an object group under the application of the version control function. Historical is a class name of an object for use in storing ② information specific to the data which are application units of the version control function. Version is a class name of an object for use in storing the information related to a specified version of each application unit of data.

Figure 4:
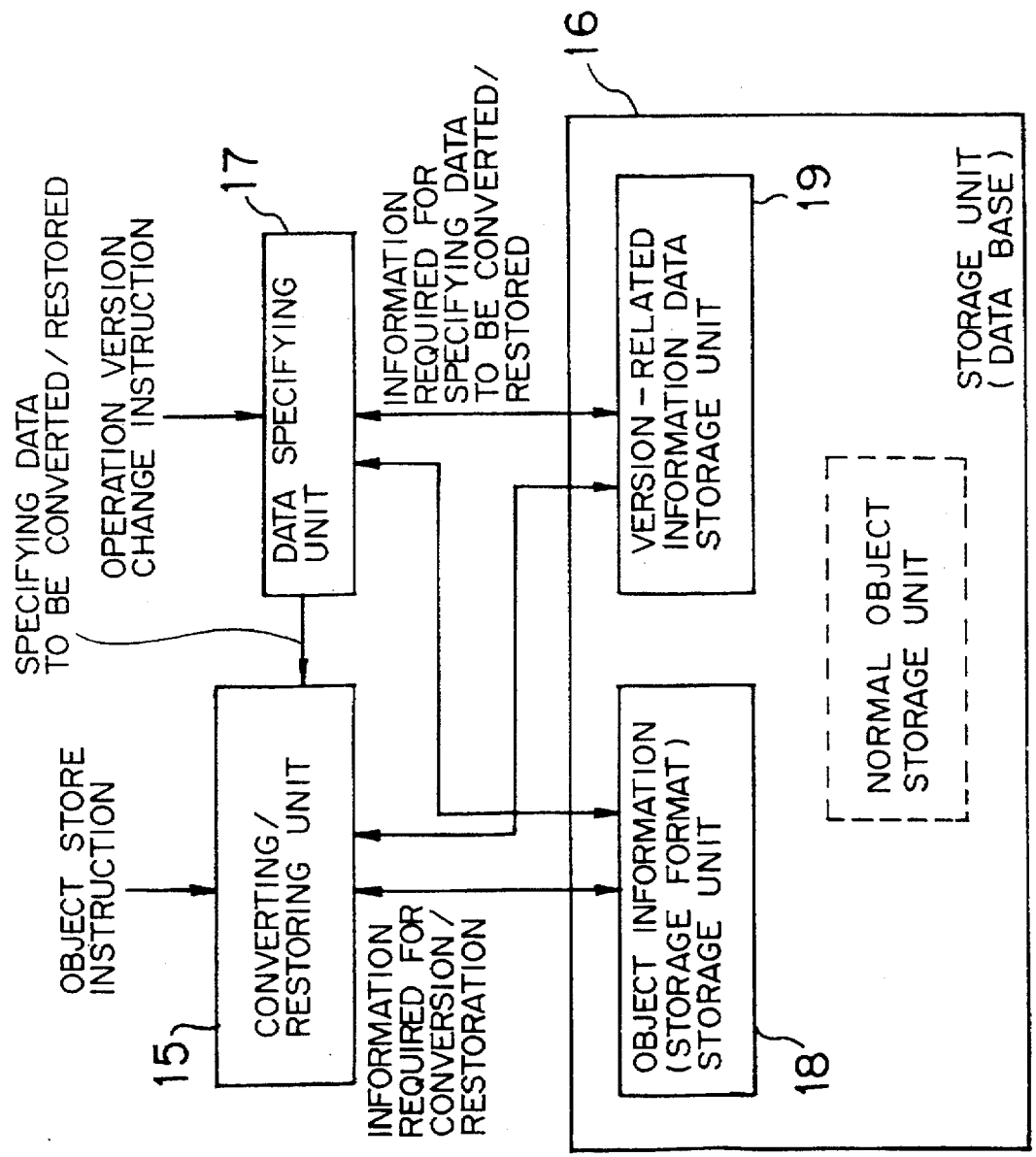
FIG. 4 is a block diagram showing an example of the configuration of the version control device.

The version control function of the version control device is to store and manage data of the same specification processed into a plurality of versions and refer to and reuse the data when necessary. Fundamentally, the function is composed of a data storage function and a version changing function. In most cases, a data retrieving function is provided to retrieve and specify a version to be operated. FIG. 4 shows an example of embodiments of the version control device. The version control device shown in FIG. 4 comprises a converting/restoring unit 15, a storage unit 16, and a data specifying unit 17. The storage unit 16 comprises an object information storage unit 18 and a version-related information storage unit 19 in addition to an normal object storage unit. It is one of the important features of the present invention that the object information storage unit 18 and the version-related information storage unit 19 are separate from each other. Conventionally, these units are incorporated into one unit.

The version control device has, for example, three functions as follows.

First, it has a function of converting data to a storage format. The converting function is to perform a converting operation on data to store plural pieces of the data having the same specification so that the plural pieces of data regarded apparently to have an identical specification can be internally recognized in the system as being different from one another.

Second, the version control device has a function of restoring the data from the storage format to the normal format. The restoring function is to restore the information in the storage format obtained by the converting operation to their normal format. The first and second functions can be realized by the converting/restoring unit 15 shown in FIG. 4.

Third, the version control device has a function of storing object information and version-related information. The storing function is to store the object information in the storage format obtained by the above described converting operation together with its version-related information, and can be realized by the storage unit 16. FIG. 4 shows the data specifying unit 17 for specifying the data to be converted and restored by the first and second functions in addition to the converting/restoring unit 15 and the storage unit 16.

One of the feature of the present invention is, as described later, not to specify a data type for a unit data under the application of the version control function. A schema, class, instance, slot, method, file, etc. can be recognized as data with a user definition or by the system.

The above described function of operating the stored information is to write, retrieve, and read the version-related information (in this example, the information is divided into three layers for management), and to convert data to the object storage format at the application of the version control function and restore data to the normal format.

The information required by the version control function is divided into three layers to be stored by a storing function. It is obvious that a function should be provided to use the stored information. The function is referred to as an operating function in this example.

The practical method of adding various user-definitions is system-dependent. Although it is not specified in this example, this function divides into layers the version-related information independently of the object to be processed and in consideration of the range of its influence. The function can be realized when applied to a data base (DB) which can be used in storing and managing object-oriented data.

For example, assume that a user wants to add as version-related information a cause of the creation of a version. Since the information relates to only a specific version of an object, it affects no other portions (stored information related to an object group, and stored information specific to an object to be processed), and only the stored information related to a specific version (for example, by using a inheriting function) is needed to be changed. That is, adding a portion storing the cause of the creation of the version to a function of storing the information related to a specific version effectuates the function.

An object is a set of version information or a cell having a function of storing the version information. Each object stores different contents of information.

Accordingly, to show a practical example of each object, the information stored in each object should be presented. Stored information is described after being divided into the above described three levels. First, slots (data items) forming Version Control of class ① is described. Only a slot is explained here, and a related method is omitted because the storage of data in a slot as a function of each object is an important function, and no method other than a data get/set function is provided.

[Slot Name] Version Flag

[Allowable Value] ON, OFF

[Meaning] Flag for use in determining whether or not the version control function is applied to the entire system. Either ON (when the version control function is applied) or OFF (when the version control function is interrupted) is selected.

[Note] When a system is not operated with the version control function, no object (instance) exists and the flag need not represent the state.

[Slot Name] Version Object List

[Allowable Value] NULL, pointer to a hashlist

[Meaning] Stored is a list of objects under the application of the version control function at a specified time point.

[Note] In the present embodiment, the version control function is not incorporated into the system, but is additively provided for the system. Therefore, the version-related information is also stored in an object. In the embodiment, an object under the application of the version control function can coexist with another object without the application of the version control function. Therefore, required is a function of distinguishing an object under the application of the version control function from an object without the application of the version control function. The list assures the function. The pointer to the hash list as an allowable value is a pointer to the hash list used in a high-speed retrieval of a number of version objects.

[Slot Name] Deleted Object List

[Allowable Value] NULL, pointer to a hashlist

[Meaning] Stored is a list of objects to be deleted according to a delete instruction at a specified time point.

If it is not desirable for any reason to physically delete the object after the delete instruction has been issued, then the object is moved to the Deleted Object List from the Version Object List and stored in the former.

Described below are slots forming part of Historical of class ②.

[Slot Name] Object Name

[Allowable Value] Object under the application of the version control function.

[Meaning] Stored is the information for use in specifying the data object which is a source of the version information managed by the present object Historical.

[Slot Name] Version Flag

[Allowable Value] ON, OFF

[Meaning] Flag for use in determining whether or not the object managed is under the application of the version control function at a specified point. Either ON (when the version control function is applied) or OFF (when the version control function is interrupted) is selected. The provided version control function is applied only when the flag is ON for the present object. The updating operation performed when the flag indicates OFF is recognized as modifications without updating the version itself.

[Note] The flag is used, e.g. when an object under the application of the version control function is temporarily removed from under the application of the function. Therefore, there are two types of objects without the application of the version control function at a specified time point, that is, an object having the flag set to OFF and managed by a Historical object, and an object having only a data object but not associated with a Historical object. On the other hand, an object which is changed to be under the application of the version control function at a specified time point is necessarily managed by a Historical object and has the flag set to ON.

[Slot Name] Version Control Object

[Allowable Value] Pointer to a Version Control Object

[Meaning] Stored is the link to the Version Control instance managing the Historical object.

[Note] Generally, one or more Version Control objects exist in a DB under the application of the version control function. Each Version Control object manages zero or more Historical objects. The number of Historical objects is equal to the number of objects under the application of the version control function. Therefore, if a system is designed to use the version control function but has not created any object to be supported by the version control function, then the state is referred to as 0 of Historical Object managed by a Version Control object.

The Version Control object (instance in this example) controls version information, and is provided per control object. If a user who uses a DB is a single user, or if all users request for the same control in the same environment, then there can be only one Version Control object. However, if there are multiple users and the version of an object used by a user is different from the version of the same object used by another user in another environment at a specified time point, or if multi-views are requested and the version of the object used in an environment is different from the version of the same object used in another environment at the same time point, then there should be Version Control objects of the number of different versions.

Each Version Control object stores links to Historical objects to manage which are the objects under the application of the version control function.

On the other hand, each Historical object recognizes through the links which Version Control object controls it.

[Slot Name] Version Child List

[Allowable Value] NULL, pointer to an object list

[Meaning] Listed is the derivation relationship of objects (a parent-child relationship of versions).

Each parent-child relationship of versions is stored separately for each version of an object. Only links to versions having no parent are stored here.

[Slot Name] Version Top

[Allowable Value] Pointer to a Version instance

[Meaning] Stored is an instance of a class Version managing the leading object (version No. 1) in the order of creation.

[Slot Name] Last Version

[Allowable Value] Pointer to a Version instance

[Meaning] Stored is a Version instance managing the latest version at a specified time point of the data object under management.

[Slot Name] Default Version

[Allowable Value] Pointer to a Version instance

[Meaning] Stored is a Version instance managing a version to be processed when a version o f the object under management is not specified but its object name is specified only.

[Slot Name] Active Version

[Allowable Value] Pointer to a Version instance

[Meaning] Stored is a Version instance managing an object of the version under operation (cannot active version) of the object under management.

[Slot Name] Owner

[Allowable Value] User ID (identifier) allowed by the system managed by the version control function

[Meaning] Stored is an ID of the owner of the object under management.

The owner of an object is normally defined by a DB system. However, if the version control function is applied, then it is defined by stored information according to specific access control rules if existing.

[Note] The slot can be assigned the owner name of String.

A specific access control rule refers to a rule other than an access control rule on an object as being defined by a DB system.

For example, assume that a DB system defines that the owner of an object is the creator of the object, and only the owner can delete the object.

Then, assume that the version control function is applied to the DB and version No.1 (original version) of object A created by user U1 is updated by user U2. In this case, version No.2 is newly created (provided separately from the object of version No.1), and its owner is user U2. Then, in accordance with the original rule, the owner of object A is user U2.

However, there is a case where the above described situation cannot be allowed. There also is a case where an original object is deleted and only the object of version No.2 exists if the owner of version No.1 deletes the version.

If these cases should be avoided, a rule specific to the version control function should be established such that the owner of any version of an object should be a user who has created the original version, or that the ownership of the object is transferred to the system when the object is updated by a user other than the creator of the original version. Then, the concept of an owner other than the owner managed by the DB is used for desirable access control.

Since information about an actual operator is required in addition to the information about a logical owner of an object, the original user information contained in the DB is stored as is, and the user information specific to the version control function such as "Owner" is stored in a newly defined area.

[Slot Name] Group

[Allowable Value] ID of a group allowed by a system operated with the version control function.

[Meaning] Stored is an ID of a group of the object under management.

Normally, an object group is defined by a DB system. However, if a specific access control rule exists when the version control function is applied, then it is defined using stored information here. The object group is described later.

Described below are slots forming the Version of class ③.

[Slot Name] Version No.

[Allowable Value] integer equal to or larger than 1

[Meaning] Stored is a version No. (in the order of creation) of a data object managed by the present object Version.

[Slot Name] Data Object

[Allowable Value] Pointer to an Object

[Meaning] Stored is the data object managed by the present object (difference management data if a difference managing function is introduced). The difference management is described later.

[Slot Name] Version Parent List

[Allowable Value] Pointer to a Historical, and pointer to object_list

[Meaning] List, as with the Version Child List described later, for storing the derivation relationship (a parent-child relationship of versions) of the present data object. Stored here is the derivation relationship indicating which version is updated into the present version. If no parents exist (if the present version is uniquely created), the list has as an element a Historical instance managing the Version instance. In this example, the version graph representing the derivation of versions is defined as a lattice structure. That is, if an object is considered, there can be a plurality of its parent objects and child objects. Therefore, stored here is a list of parent objects.

[Slot Name] Version Child List

[Allowable Value] NULL, pointer to object_list

[Meaning] List, as with the Version Parent List described above, for storing the derivation relationship (a parent-child relationship of versions) of the present data object. Stored here is the derivation relationship indicating which version is created by updating the present version.

The permission or prohibition of update of version of the present object can be stored here if necessary.

For example, the allowable value can be three, that is, −1, NULL (equal to 0), and a pointer to object_list. Each of them can be defined as being prohibited from having child objects, as being capable of having child objects (but not yet), and as already having a child object, respectively.

Furthermore, next_pointer in object_list (an area storing next data when they are added) can be divided into three, that is, −1, NULL, and an positive integer. These pointers respectively indicate that no child objects can be created any more, child objects can be created furthermore, and the present area has already stored a link to a child object. It is possible to prohibit the update of a version of the present data object after its child objects of a predetermined number have been created. In this embodiment, the version graph representing the derivation of versions is defined as a lattice structure. That is, when a certain object is considered, the object can have a plurality of parent objects and child objects.

[Slot Name] Pre Version

[Allowable Value] Pointer to a Version instance, and a pointer to a Historical instance

[Meaning] Stored is a Version instance managing the object created one timing before the present data object.

If the version No. of the present data object is 1, then the instance of class Historical which manages the Version instance is entered.

[Slot Name] Next Version

[Allowable Value] Pointer to a Version instance, NULL

[Meaning] Stored is a Version instance managing the object created one timing after the present data object.

If the present data object is the latest version, NULL is entered.

[Slot Name] Last Version Flag

[Allowable Value] TRUE, FALSE

[Meaning] It is indicated whether or not the present data object is the latest version at a specified time point.

Either TRUE (if the present object is the latest version of a specified object) or FALSE (if the present object is not the latest version of a specified object) is entered.

[Slot Name] Default Version Flag

[Allowable Value] TRUE, FALSE

[Meaning] It is indicated whether or not the present data object is the default version.

Either TRUE (if the present object is the default version of a specified object) or FALSE (if the present object is not the default version of a specified object) is entered.

[Note] Since the equivalent information is stored in the Historical object, this information is not indispensable.

[Slot Name] Active Version Flag

[Allowable Value] TRUE, FALSE

[Meaning] It is determined whether or not the version managed by the Version object is an operation version (an active version to be processed).

Either TRUE (if the version under management is an active version of a specified object) or FALSE (if the version under management is not an active version of a specified object) is entered.

[Slot Name] Owner

[Allowable Value] ID of a user allowed by the system operated with the version control function.

[Meaning] Stored is the ID of an owner of the specific version of an object.

This slot is used to limit a user who created the version under management, an allowable access scope of the version, etc.

The owner of the object is normally defined and managed by a DB system. However, if an access control rule specific to the version control function exists, then it can be defined and managed using the information stored in this slot.

[Slot Name] Group

[Allowable Value] ID of a group allowed by the system operated with the version control function.

[Meaning] Stored is the ID of an owner of the specific version of an object.

This slot is used to limit a user who created the version under management, an allowable access scope of the version, etc.

The group of the object is normally defined and managed by a DB system. However, if an access control rule specific to the version control function exists, then it can be defined and managed using the information stored in this slot.

[Slot Name] Create time

[Allowable Value] Time information to meet type time

[Meaning] Stored is the time of the creation and/or modification of the present data object.

[Slot Name] Comment

[Allowable Value] Optional character string

[Meaning] Stored are the reasons for the creation and/or modification of a specified object and various comments.

If various information such as a creation time, restrictions on update is stored, then the slot can be defined as follows.

```
instance:struct comment * Comment;
struct {String Cstring ;
```

-continued

```
        time    Ctime ;
        :                          }
        comment
```

Described above are the slots forming each of the three levels ① through ③. In this embodiment, all objects in a system under the application of the version control function are processed as one object group. Class Version Control ① defines the type of an object for storing information relating to the group. Class Historical ② is an object for storing information related to each object under the application of the version control function. Class Version is an object for storing the information specific to each version of each object.

For example, if the version control function is applied to class A stored in the system, then the information indicating that class A under the application of the version control function exists in the system is stored in Version Control instance (object) because it is associated with the entire system. Since the information that class A is under the application of the version control function is specific to class A, it is stored in the Historical object. Since the information about each version of this class (for example, as to who has created version.3, when it has been created, and which version has been modified to create it) is the information specific to the version, it is stored in the Version object.

The "Group" at the end of the above described class Historical ② (as in the class Version ③) is a concept for use in controlling access to a UNIX file. That is, in addition to a function of allowing, for each owner, a read, write, and execute of a file, users belonging to a group specified as "group" is permitted to access the file.

For example, the information about file version.define is represented in the following format according to UNIX.
-rwxr-x-x yosizawa mmdb 2533 Mar 8 09:45 version define This indicates that the owner of the file is yosizawa, and mmdb is specified as a group. Since -rwxr-x-x is specified as an access control item, the owner user yosizawa can read(r), write(w), and execute(x) the file. The user belonging to group mmdb can read(r) and execute(x) the file, and the other users can only execute(x) the file.

The above described definition of class is completely system-dependent, and is used in the system (computer operated with the operating system of UNIX, the program of C and C++) operated with the version control function. Regarding "group", the system operated with the version control function involves the concept of group. The group is specified to develop the concept into the version control function, that is, to apply to each version a concept equivalent to group applied to the object under the application of the version control function.

Therefore, different definitions are used in different systems. Obviously, this item does not exist if the concept of group is not recognized by a system.

Described below is the difference managing function in [Meaning] of the slot of Data Object of class Version ③.

A version Control is to recognize the existence of plural pieces of data of the same specification and effectively use them. If this function is additively provided, some data should be converted because the system is not designed to recognize plural pieces of data of the same specification.

For example, object A can be renamed and stored as A.1, A.2, A.3, . . . , and the object to be in operation can be renamed back to A again when necessary. Otherwise, all versions can be stored in information storage object Vs and managed therein.

In this example, the difference management can be used as the storage method.

The difference management refers to a method of storing a plurality of objects by actually storing only differences in information from a reference object. For example, if A.1 is updated and A.2 is created as a result of the addition of a slot, then the effect of storing both A.1 and A.2 can be obtained by storing the only information indicating that A.2 is obtained by adding a slot to A.1.

Since the storage capacity of the computer implemented to use the version control function is limited, a problem can be predicted for the future if a number of objects are stored and each object has a plurality of versions. Thus, a desirable method has been searched for to reduce the amount of data, and the difference management has been regarded to be applicable as a suitable data storage method.

Described below is the processes performed by the version control function. Since the function is additively provided for an OODB, the version control function is specified to be applied first. Then, a Version Control instance is created and the state of an object in the system is shown in FIG. 5.

Figure 5:
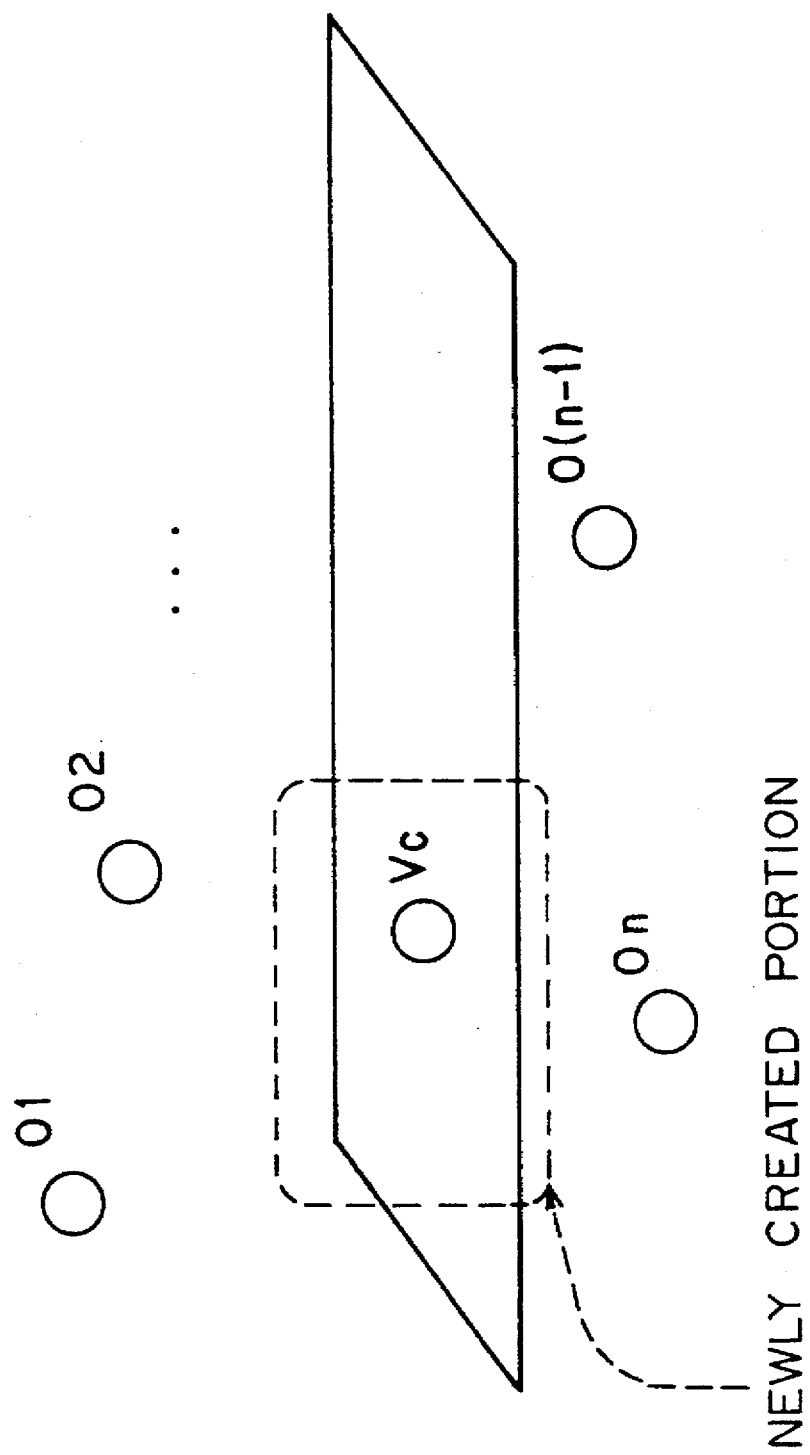
FIG. 5 shows the state of an object in the system at the beginning of application of the version control function.

In FIG. 5, object Vc is an instance newly created to provide the function, and O1, O2, ..., O(n-1), and On are the objects already existing at this time. Note that the version control function has just been provided and no objects have been under the application of the function yet.

Figure 6:
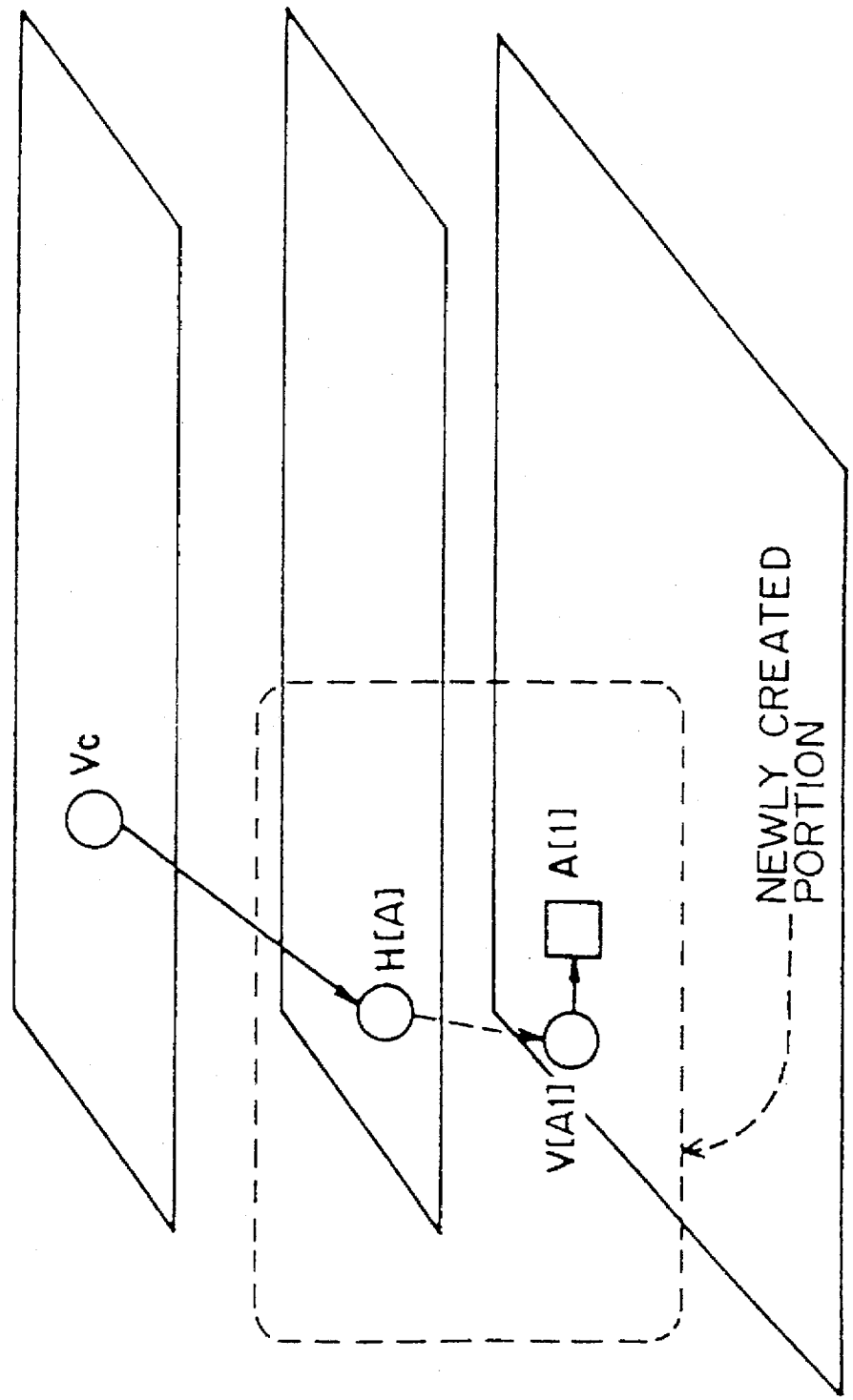
FIG. 6 shows the state of an object when the version control function is applied to class A.

Furthermore, a Historical instance is not created until an object under the application of the version control function appears. FIG. 6 shows the case in which the version control function is applied to class A. In FIG. 6, class A only is under the application of the version control function, and no other classes are under the application of the function. Also, objects other than enclosed portions exist, which are not related to the version control function. Class A has only one version and its old version has not been stored yet at this point. That is, the following operations are performed in the system.

First, object H[A] which manages the version information about class A is created. Vc can refer to the information. H[A] stores the version information about A.

Second, class A is defined as being under the application of the version control function, and necessarily becomes version no.1 of class A. That is, it is converted into A[1].

Then, object V [A1] is created to store the information about A[1], and H[A] can refer to the object V[A1].

V [A1] stores a pointer to A [1].

Figure 7:
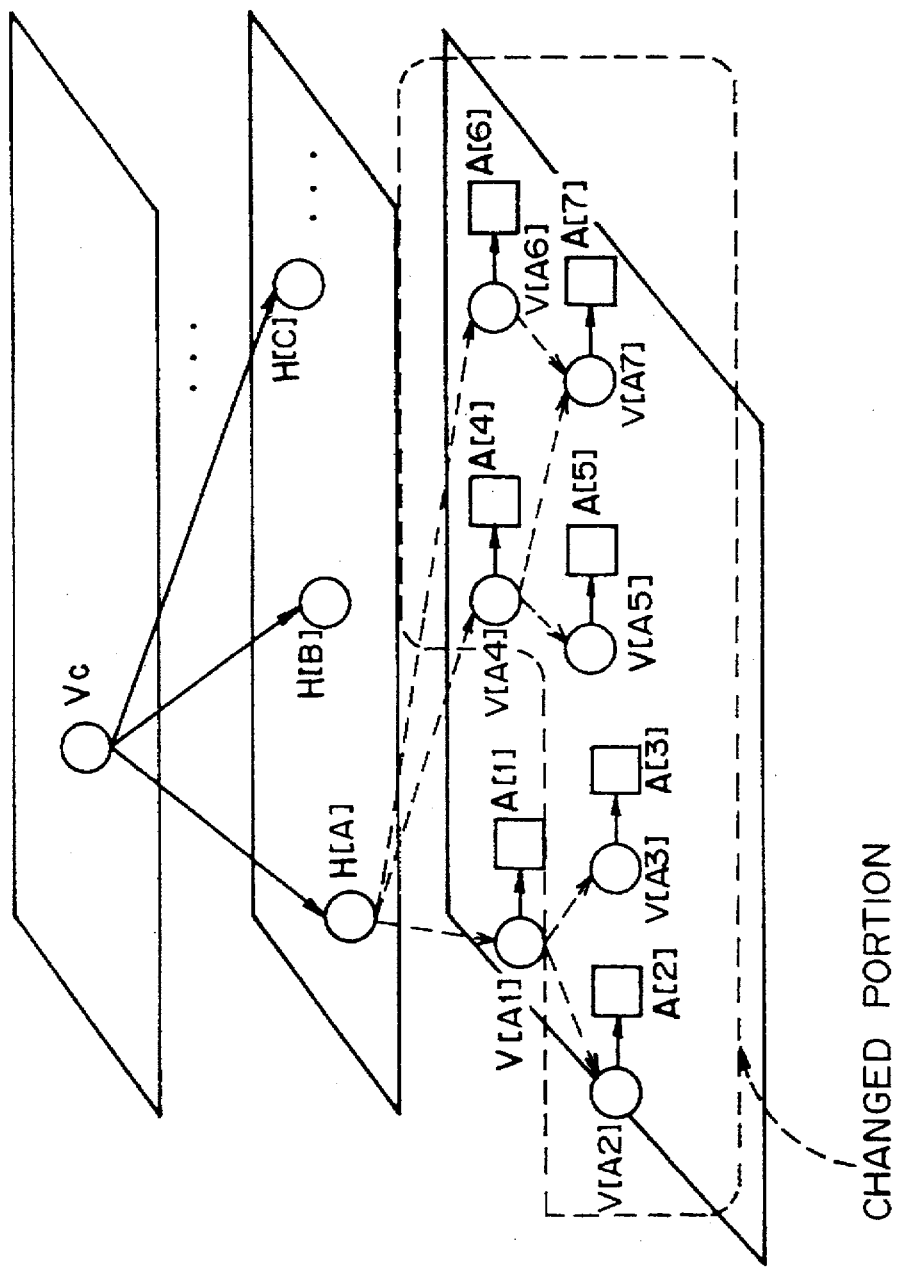
FIG. 7 shows a state of an object when a plurality of versions are created for class A.
Figure 8:
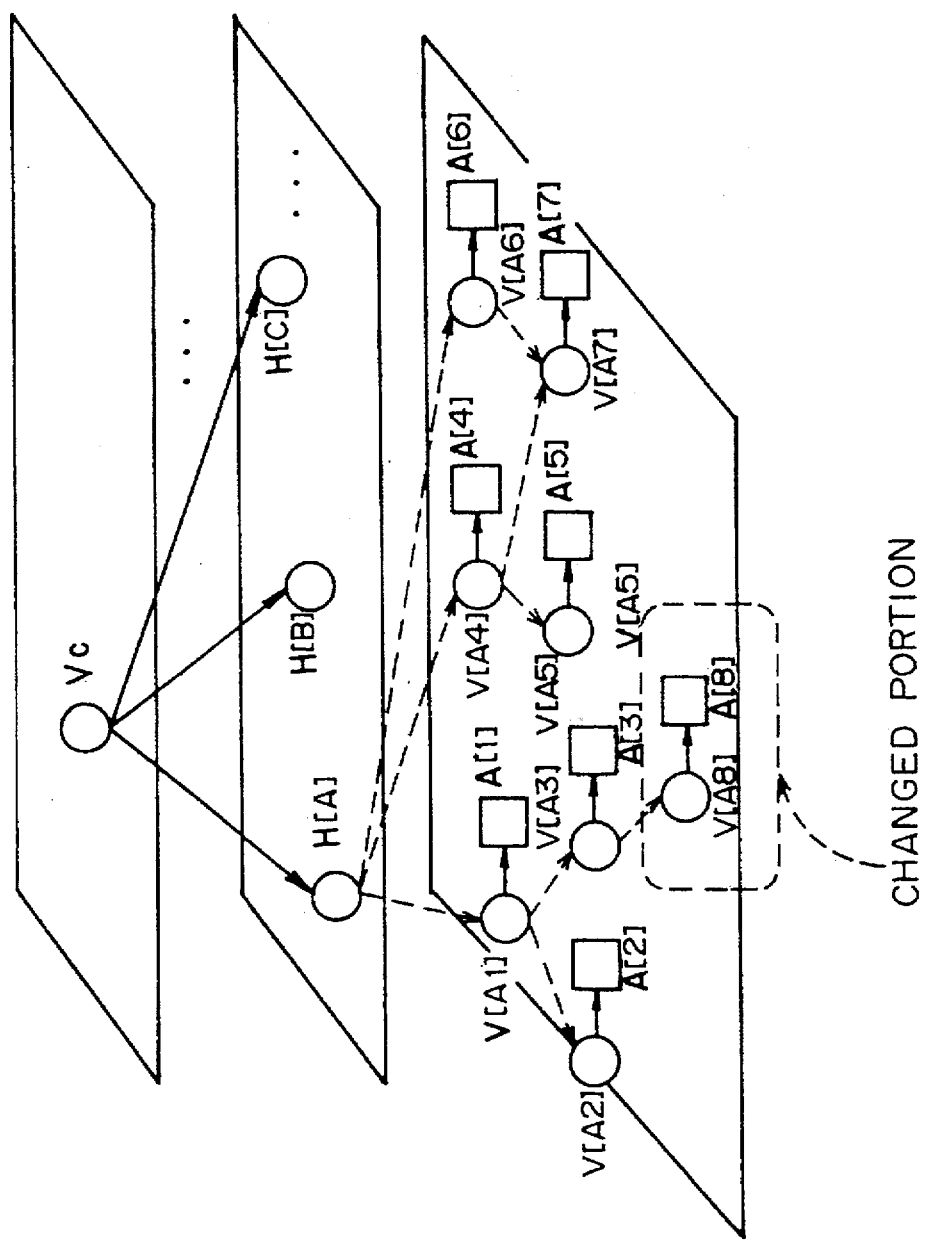
FIG. 8 shows a state of an object when a new version is created for class A.

FIGS. 7 and 8 show the states in which plural versions of object A are created. FIG. 7 shows the state in which the versions of class A exist up to No.7. FIG. 8 shows the state in which version No.8 has been newly added. In FIG. 7, objects B and C are newly added as those under the application of the version control function in addition to class A, and objects H [B] and H [C] exist and manage the version information about the added objects. Like H [A], H [B] and H [C] have one or more V[on] having lattice structures, and objects B[n] and C[n] having version information V[Bn] and V[Cn], respectively. If a version of an object under the application of the version control function is updated as in FIG. 8, the data object and the instance of object V which manages the version-related information about the data are added as a set of objects into the system.

Object V [on] is incremented by 1 each time a version is added.

Using the slots of each class ① through ③, the present invention can store the parent-child relationship of versions among multiple parent and child objects. It is recorded in version object V [A7] that A[7] has been created by merging two parent versions A[4] and A[6]. In FIGS. 5 through 8, unlike in FIG. 3, each version A[n] and the corresponding control information storage object V[An] are shown more closely.

Figure 9:
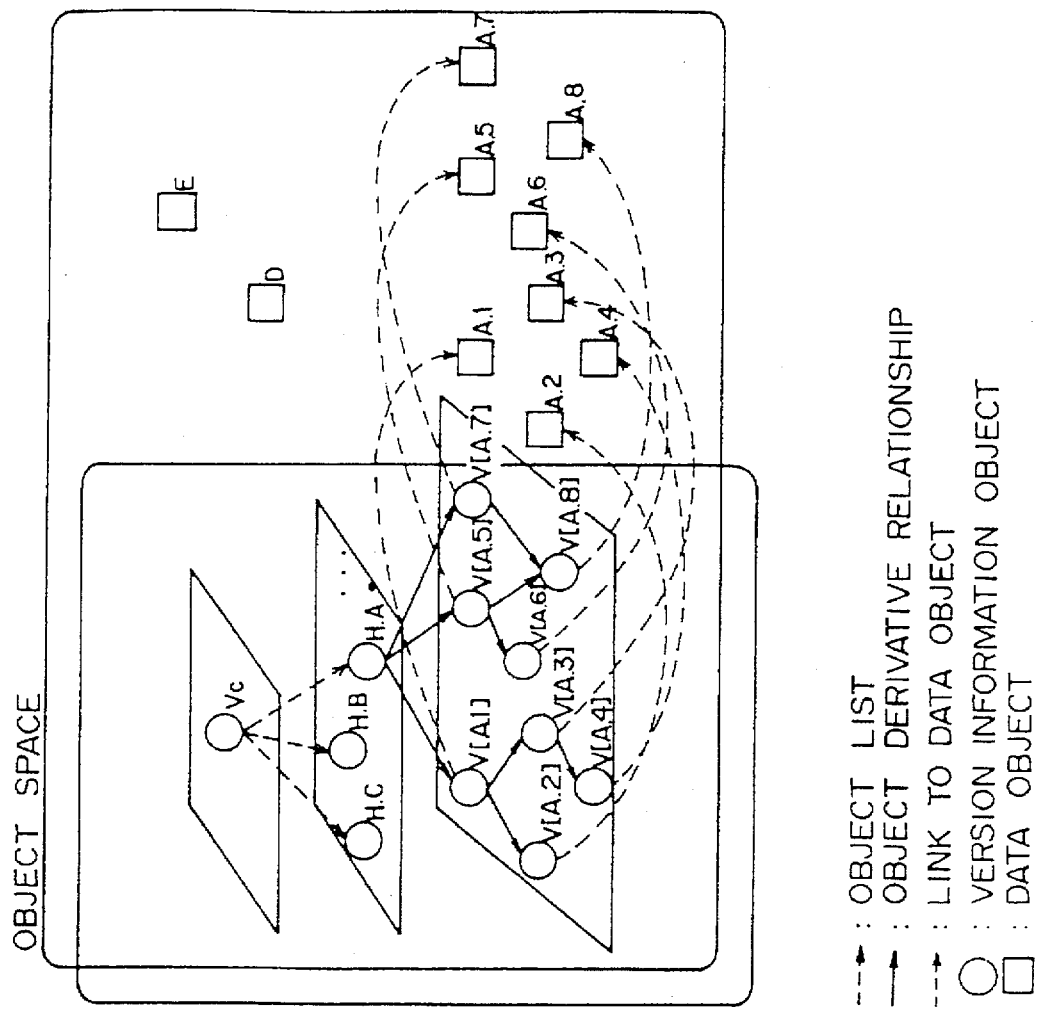
FIG. 9 shows the part newly created for the version control function in an object space.

As in FIG. 8, FIG. 9 mainly shows the portion newly created to use the version control function in another example in an object space in which versions of object A have been created up to No. 8. FIG. 9 corresponds to FIG. 3, and is different from FIG. 8 in relationship among objects V[An]. In FIG. 9, objects H.A, H.B, and H.C correspond to objects H[A], H[B], and H[C] shown in FIG. 3. Object V[A.1] and the like correspond to object V[A1] and the like, and data object A.1 and the like correspond to data object A[1] and the like.

Described above is the basic explanation of the version control function according to the present invention. Other important features of the present invention are described below. First, the feature of the data to be under the application of the version control function is described. The feature of the present invention is not to place restrictions on the data type. That is, the present invention allows data of different types to be under the application of the version control function in a system by providing a version managing mechanism not distinguishing data under the application or not placing restrictions on a data type.

Thus, the version control function applied to data represented by an object and that applied to a data group represented by a schema can be realized by a single mechanism in a single system.

Therefore, three types of data, that is, instance, class, and schema are considered as objects under the application of the version control function. In this case, the entire system is regarded as one object group and can be controlled by a single Version Control object. That is, in the system, all objects under the application of the version control function are managed by a single Version Control object.

According to the present invention, data under the application of the version control function and an object for storing the version-related information are independent of each other. Therefore, the version information does not relate to data. Thus, a single version managing mechanism can be applied to different types of data of different configuration levels, that is, a class (type class) and a group of instances (type instance) belonging thereto, and a schema (type schema) and a groups of classes (type class) forming the schema.

Since the version information is managed separately for 3 levels in consideration of the scope of an influence even if the attribute of data affects version information, the information (version information affected by the data attribute) only need to be stored in objects where they are required. This feature is also required to manage plural types of data in a single mechanism. The feature is further described later.

For example, data types of plural levels are schema, class, and instance as described above. So the number of levels are three in this case. Schema includes class, and class includes instance. Therefore, they are not equal to one another, but are different in level from one another.

Figure 10:
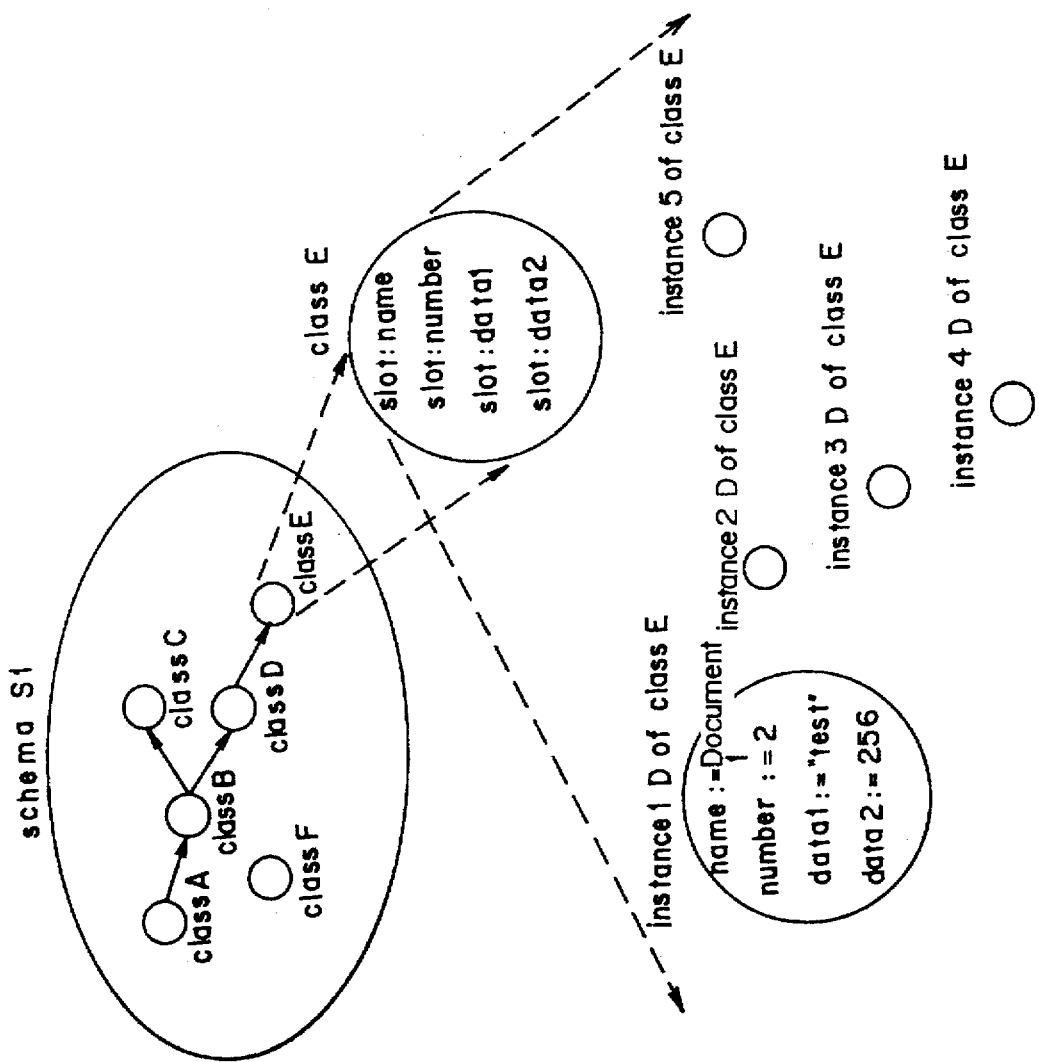
FIG. 10 shows the relationship among schema, class, and instance as objects of different levels.

FIG. 10 shows the relationship among schema, class, and instance. Schema represents the relationship between classes, and class indicates the definition of an object structure. Instance refers to a data storage cell in a general meaning. In FIG. 10, schema S1 represents the relationship among classes A, B, C, D, E, and F. Class E defines four slots, that is, name, number, data 1, and data 2. The values of the slots of instance 1D of class E are Document 1, 2, "test", and 256 respectively.

Figure 11:
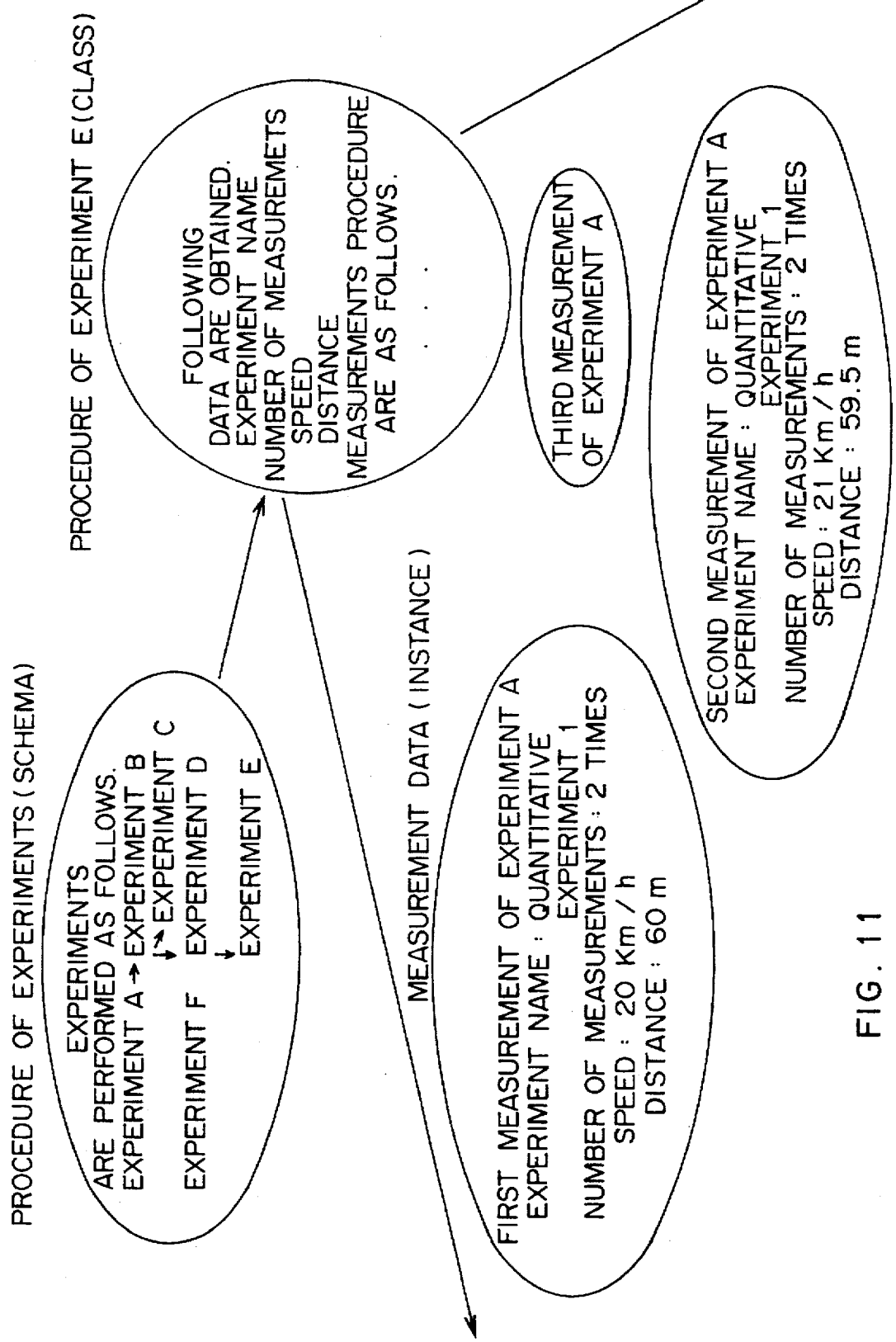
FIG. 11 shows practical examples of schema, class, and instance.

Examples of schema, class, and instance are an experiment procedure of measuring plural pieces of data, measured data format and measuring method, and measured data respectively. The relationship among these examples is shown in FIG. 11. The schema describes an experiment procedure including the relationship of each experiment phase. The class describes the phase, procedure, and a list and format of data to be measured in each experiment. The instance is a storage cell of measured data.

Schema stores a list of classes and the relationship among them, and recognizes information as to, for example, which experiment follows a specified experiment, which experiment data should be provided for a specified experiment, etc. Class defines a data format. In this case, defined are an experiment name, a method of the measurements including the number of measurements, and the data format of speed, distance, etc. A measuring method and necessary data are indicated by each class. Instance is individual data in the format of each class. In this example, it refers to measured data. Therefore, if a measurement is performed under the same condition for a plurality of times, then instances are created for the number of measurements, and each measurement result is stored in each instance.

Described below are the case in which the above described data attribute affects version information, and necessary conditions to manage plural data types in a single mechanism.

For example, assumed is the case in which the version control function is applied to two types of objects, that is, a program being developed and an application program used in the program being developed. The significance of updating the version of the two types of programs is explained below.

The version of a program being developed is updated by a user. Accordingly, the version-related information to be stored at a user's request can be an update time, a reason for updating, an updated portion (difference from the previous version), etc. Therefore, a storing function is required to store these items in an object storing the version-related information.

On the other hand, the application program used in the program being developed requires no function of storing information about, for example, an updated portion.

Therefore, the version-related information specific to the two object types is different between them, and a different format should be prepared as object V shown in FIG. 9.

Explained above is the case in which the attribute of data affects version information.

In this case, however, an influence of the update covers only the range of V in FIG. 9, and no influences can be detected on other objects Vc and H.

That is, data of different types (four types in this example), e.g. a program being developed, an application program used in the program being developed, an execution result of the program, a measurement result relating to the execution can be managed in a single mechanism.

The second important feature of the present invention is to store the above described parent-child relationship of version data. That is, the parent-child relationship of data in a version graph can be recognized by a version control mechanism by recognizing plural pieces of existing data as original data according to the present invention.

Thus, the parent-child relationship of data can be recognized by the system, not by a user's memory, when a plurality of existing versions are updated as parent data (original data) into a new version of data, e.g. through a merging operation.

The second feature is realized by providing an area for storing the parent-child relationship of versions to be processed. Since the information is regarded as unique to a specified version of each object, an object is provided in V[An] as described above. That is, the parent-child relationship between an existing version and a new version, which is a part of version-related information, is also referred to as a derivative relationship. This relationship is recognized as the version-related information of the existing version or the new version.

Accordingly, the relationship is stored in either a relationship information storage object of an existing version or that of a new version, or in both objects (refer to the slot Version Parent List and a slot Version Child List in the above described class Version). In this case, the relationship is stored in both objects. That is, version.3 of A is derived from version.1 of A, then the information that the version has been derived from version.1 is stored in the objects which store the relationship information of version.3 of A, and the information that the version has derived version.3 is stored in the objects which store the relationship information of version.1 of A.

The third important feature of the present invention is to maintain the consistency of data and to prevent a change which will disturb the successful maintenance of the consistency in the system or to restore data to an original state by notifying a related object of the predicted change of an object and preliminarily confirming the influence of the change.

This function can be obtained by exchanging the priority, in a normal change transmitting function, between a change to an object and the consistency in an object group by inverting the sequence of a changing operation and a consistency confirming operation.

Figure 12:
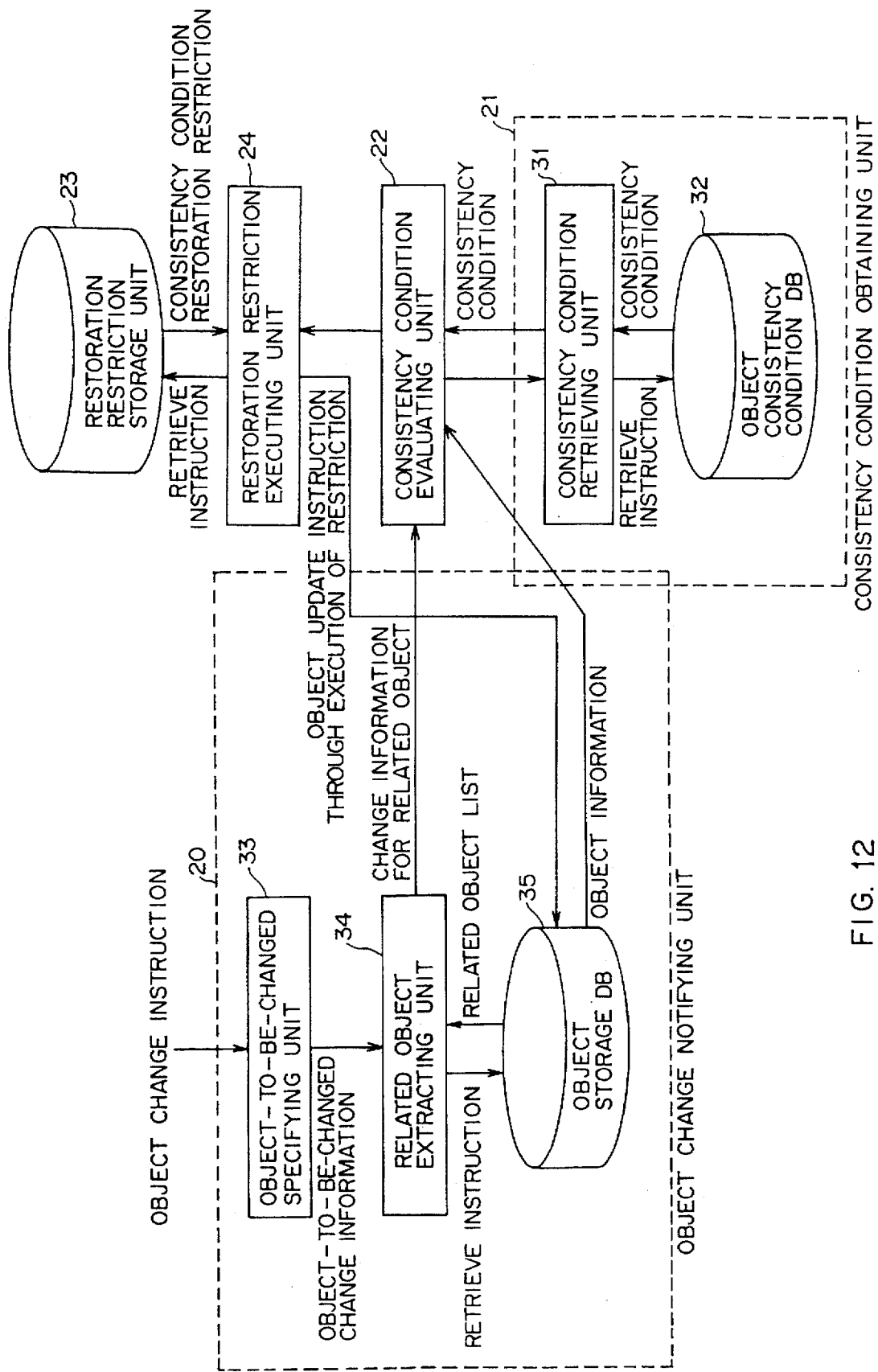
FIG. 12 shows the flow of data and the mechanism for maintaining the consistency of data.

FIG. 12 shows the mechanism of maintaining the consistency of data and the flow of data.

The data consistency maintaining mechanism shown in FIG. 12 comprises an object change notifying unit 20 for transmitting a change of an object; a consistency condition obtaining unit 21 for obtaining the consistency condition of data; a consistency condition evaluating unit 22 for evaluating the consistency condition; a restoration restriction storage unit 23 for storing restoration restrictions for consistency; and a restoration restriction executing unit 24 for executing the restoration restrictions.

The notification mechanism through the object change notifying unit 20 can be a change notifying mechanism at the update of an object. In addition to the change of data of an object to be changed, a change of a version under operation (described later) can be considered for determining a notification timing.

Required also is a canceling unit for canceling a change if necessary.

If a change instruction is issued for an object, then a change object specifying unit 33 in the object change notifying unit 20 specifies the name of an object to be changed, and a related object extracting unit 34 obtains a related object list from an object storage DB 35. Then, the object change notifying unit 20 notifies a related object of the name of an object and the contents of the change instruction. The present function differs from the normal change transmitting function and a change has not been made yet at this point, but the object change notifying unit 20 transmits only the contents of a planned change. Upon receipt of the notification of the contents of a planned change, the related object checks whether or not the change disturbs the consistency of data, especially whether or not inconsistency arises between the change and the related object itself. The check is conducted by the consistency condition evaluating unit 22 by evaluating the consistency condition obtained by a consistency condition retrieving unit 31 in the consistency condition obtaining unit 21 from an object consistency condition DB 32.

Unless inconsistency has arisen, that is returned to the notifying object (object to be changed). If inconsistency has arisen and an modification is required, then the restoration restriction executing unit 24 reads the restoration restrictions for consistency from the restoration restriction storage unit 23. According to the restrictions, the related object is processed and changed, and the result is returned to the notifying object.

The object to be changed can be actually changed for the specified contents only if it has received notifications that consistency is maintained or the inconsistency is recoverable (and the change can be successfully made) from all objects which received the planned change.

The contents of the change at a notified object can be the cause of the transmission of a secondary change. In this case, changes are transmitted in the following sequence in a normal change transmission.
P1: First object is changed.
P2: A change notification is provided for a related object
P3: A related object is changed.
P4: A change notification is provided for an object related to the related object.
P5: <Control is returned to P3 if a further related object exists.>

Thus, the change is transmitted sequentially. On the other hand, the consistency maintaining method, that is, the third feature of the present invention transmits a change as follows.
Q1: The contents of a planned change is transmitted to a related object.
Q2: The consistency is confirmed at the related object.
Q3: The contents of a planned change is transmitted to an object related to the related object only when it is determined that a changing operation is required on the related object to maintain the consistency.
Q4: <Steps Q2 through Q5 are recurrently performed.>
Q5: If all changes have been successfully made for consistency of the object related to the related object, or if no changes are required in the object related to the related object, then the related object is actually changed.
Q6: If the related object has been successfully changed, then the notified object is actually changed.

In the consistency maintaining method according to the third feature of the present invention, the consistency of data among related objects is considered when an object is updated. Even if the consistency is not assured, a recovery is made for consistency. If the recovery still cannot be successfully made, the object to be changed is prohibited from being changed.

A restoring method should be carefully considered. Fundamentally, assuming that the consistency of the DB35 is guaranteed, the destruction of the consistency is caused by the change made then. However, it is not desirable to remove the cause of the destruction directly because it means that no changes can be made at all.

Then, other portions should be changed depending on the change. The restoration restrictions are the priority, changing condition, and other features of an change operation as to what portion of related objects are changed and how to change a number of related objects.

The determination as to whether or not an object has been successfully changed is made by the consistency condition evaluating unit 22 shown in FIG. 12. The determination result is instructed by a flag indicating either an object update instruction or an update prohibition.

Since the present function is system-dependent, the general description is not made here. However, if the executable program for the present function is written in the C language, it is written such that the determination result depends on the return value of a consistency condition evaluation function.

Then, considered is a simple case where only two classes are related as a practical example of steps Q1 through Q6 in a consistency maintaining method as the third feature of the present invention.

In designing a system, each class is regarded as a storing function of the data of the parts forming the system.

One of the two classes is an object Circuit for storing the data of a circuit, and the other is an object Box for storing the data of a box for covering the circuit.

The configurations of the objects class Box and class Circuit are assumed as follows.

--- i) class Box

[Slot Name] length
[Allowable Value] ≦ 0 20
[Meaning] Length of a box, and should be equal to or shorter than 20 cm.
[Slot Name] width
[Allowable Value] ≦ 0 10
[Meaning] width of box; should be equal to or smaller than 10 cm in consideration of other parts.
[Slot Name] height
[Allowable Value] ≦ 2
[Meaning] height of box; should be equal to or smaller than 2 cm in consideration of other parts.
[Slot Name] material
[Allowable Value] metal
[Meaning] material of a box
ii) class Circuit

[Slot Name] length
[Allowable Value] equal to or smaller than a box length
[Meaning] length of a circuit
[Slot Name] width
[Allowable Value] equal to or smaller than a box width
[Meaning] width of a circuit
[Slot Name] height
[Allowable Value] equal to or smaller than a box height
[Meaning] height of a circuit
[Slot Name] component of configuration
[Allowable Value] list of circuit elements as components

.
.

---

Assume that a change is made to object Box 1, that is, actual box information. Box 1 is structured according to the definition of Box. A change is planned on the above structured Box 1 as Box 1. width:=8 cm.
Q1: Upon receipt of the change instruction, the system retrieves a related object of object Box1 to obtain Circuit 1.

A planned change on Box 1 and the contents of the change are transmitted to Circuit 1.

Q2: Object Circuit 1 is structured according to the definition of Circuit. The state of Circuit 1 at this point is as follows.
Circuit 1. length:=18 cm
Circuit 1. width:=9.5 cm
Circuit 1. height:=1.5 cm First, the consistency of data is checked. The system retrieves Circuit and recognizes that slot Circuit. width is related to Box and a relationship is defined with respect to a size. When a change Box1. width:=8 cm is given, it is determined whether or not the relationship continues to hold.

In this example, since Box width<Circuit. width holds and it does not meet a restriction of the relationship of size, it is returned as information.

Upon receipt of the information, the system prohibits the present planned change, that is, the change of the value of Box1. width, thereby terminating the operation.

For example, if a change is planned as Box1. width:=10 cm, which meets the restriction, it is transmitted as information to an original object.

Q3: In this example, since the related object (Circuit 1) of the object to be changed (Box1) has no related object, the operation Q3 is not required.

Q4: In this example, since the object to be processed (Box1) has no related object except Circuit, the operation Q4 for performing a similar operation on other objects is not required.

Q5: A change is made in Q5 if the related object (Circuit 1) is affected by a change planned to the object to be changed (in this case Box1. width:=10 cm) and needs a change. No change is required in this example.

Q6: The system recognizes through the information from the related object that the related object permits the change for the object to be changed, and actually executes the change.

The fourth important feature of the present invention is also a function of maintaining the consistency of data. Instead of the conventional change transmitting function that is, changing an object and, as a result, changing other objects and maintaining the consistency of the entire data as an object group, the present invention provides a function of changing only an object specified to be changed and collectively making other changes required on other objects at a predetermined timing.

This function is used to maintain the consistency of data in the system, and is specifically effective if the influence of a change is not so great and no real-time processing is required. That is, the consistency maintaining function of the fourth feature is to omit a consistency checking operation performed by a conventional change transmitting function when a change is made, and to provide a checker for operating at a predetermined timing to maintain the consistency of data.

Required mechanisms are a checker and an operation instructing unit for instructing the operation of the checker.

When an object is changed, only a first object planned to be changed is changed regardless of the transmission of a change.

The mechanism of maintaining the consistency of the system, that is, a checker, operates independently of a change timing of the object. An operation timing for the checker is determined by a user or a system. According to the operation timing, the checker operation instructing unit issues an instruction to the checker. In response to the instruction, all changes are transmitted in the system and the checker checks the changes.

Figure 13:
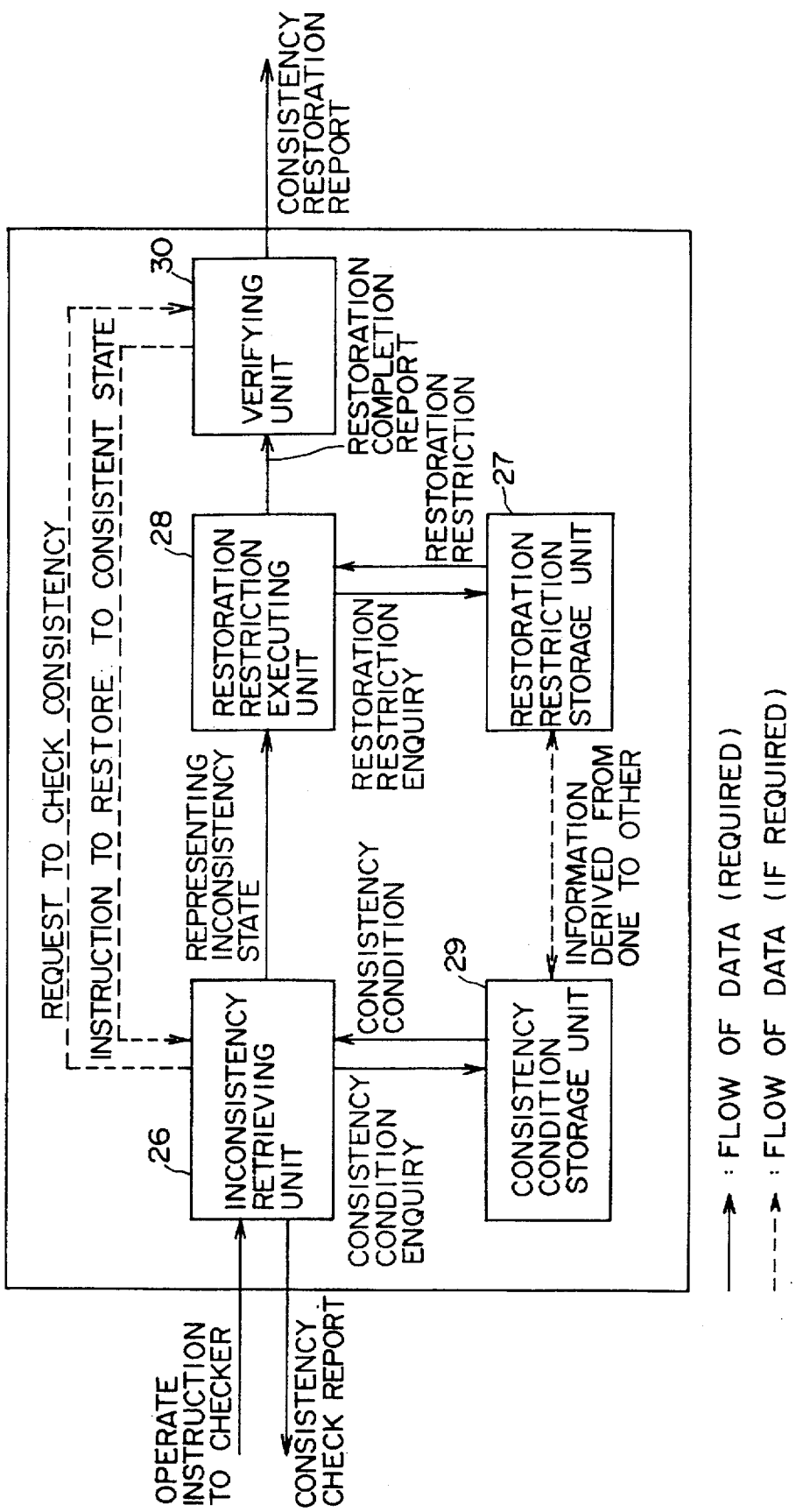
FIG. 13 is a block diagram showing an example of the configuration of the checker.

As shown in FIG. 13, the checker basically comprises an inconsistency retrieving unit 26, a restoration restriction storage unit 27 for storing consistency restoration restrictions, a restoration restriction executing unit 28 for executing restoration restrictions, a consistency condition storage unit 29 for storing a consistency condition, and a verifying unit 30 for verifying the consistency after a restoration. First, the inconsistency retrieving unit 26 retrieves an object group, extracts an inconsistent portion in which consistency is destroyed. The restoration restriction executing unit 28 obtains from the restoration restriction storage unit 27 the restoration restrictions corresponding to the detected destructive portion, thereby restoring data to a consistent state.

The verifying unit 30 checks whether or not the extracted inconsistency is removed and whether or not the restoration to the consistent state has destroyed a consistency in other portions.

A final consistency restoration report is issued after the verifying unit 30 has confirmed the consistency of the entire data. If the verifying unit 30 cannot guarantee the consistency, then the system issues again an instruction to retrieve an inconsistent portion, and the restoration restriction executing unit 28 is activated.

If the inconsistency retrieving unit 26 cannot detect an inconsistent portion, then the restoration restriction executing unit 28 need not to be activated afterwards, but the verifying unit 30 is directly activated. Then, it is reported that a consistent state is maintained after the consistency is confirmed.

The consistency maintaining function, that is, the fourth feature of the present invention, tries to recover from an inconsistent state by a predetermined method if the inconsistency has been detected by the checker. The word predetermined indicates that a method is entered in a system before the version control function is activated. For example, a state assigned a higher priority is selected and the other versions are deactivated according to entered priorities, or the method is determined based on a conversation with a user, or an unconditional update is executed.

Figure 14:
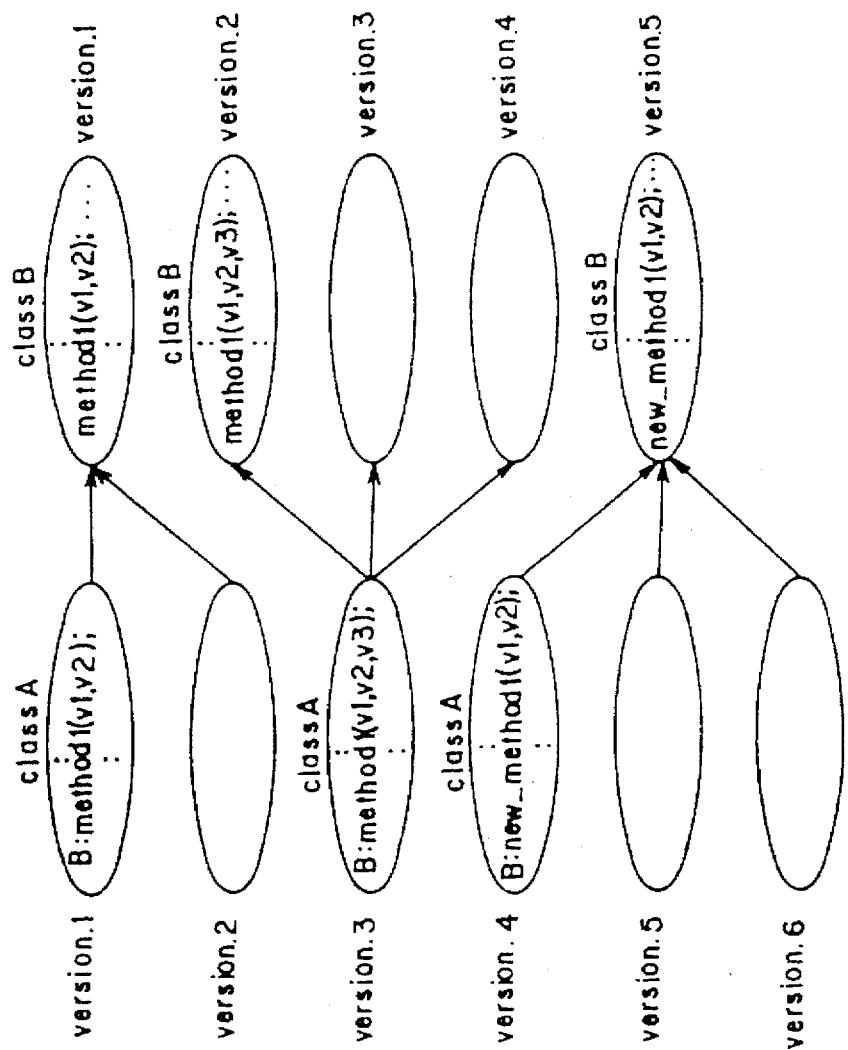
FIG. 14 explains the consistency among classes.

For example, assume that a checker is activated when class A and class B having the inter-class relationship as shown in FIG. 14 are version.3 and version.5 respectively.

A consistency condition refers to a consistency between a specification of a called method and that of a defined method.

In FIG. 14, showing a possible combination of versions, two classes A and B exist, and class A calls a method defined by class B to realize a present function. Accordingly, the function invoking (referring) object and the function providing (defining) object should match in interface. In this example, interface matching is referred to as being consistent. To maintain the consistency, version.1 of B should be necessarily used when version.1,2 of A is being used. If version.3 of A is being used, then the version of B should be one of version.2, 3 and 4. If one of version.4, 5, and 6 of A is selected, then version.5 of B should be necessarily used.

The inconsistency retrieving unit 26 recognizes the condition, and checks whether or not each of the classes under operation meets the condition (refer to FIG. 13). When the consistency is destroyed, it is transmitted to the restoration restriction executing unit 28 as information. The restoration restrictions are executed by a predetermined method. The operations performed by the restoration restriction executing unit 28 depend on the method predetermined and stored in the restoration restriction storage unit 27.

Some examples of the above described operations are listed below.

If the system is implemented to have a conversation with a user, the system notifies the user that currently used are version.3 of class A and version.5 of class B and that inconsistency has been detected. Then, the system waits for an instruction. The subsequent operations depend on the contents of a user input.

If a priority is specified and class A has a higher priority than class B, then class B should match version.3 of class A. The version of Class B is decremented one by one until a version meeting the consistency is obtained. As a result, the version of class B is changed into 4.

The fifth important feature of the present invention is a function of reproducing the operation environment at a certain time point by recording the data and their version at the time point. That is, a function is added to store information about the object and its version operating (an active version) at a specified time point and time of a change made to the object and its version. Using the information, the version operated at any time point in the past can be set under operation again and the data environment used at the time point can be reproduced.

If the version control function is introduced, the information about the version of an object being operated at a time point is also required to recover an environment in addition to the relationships among the objects used at the time point. The reproduction function stores the information and reproduce a state at the time point when a state restore instruction is later issued. The function requires an object for maintaining the environment information in addition to the above described three levels of objects. If the environment information obtaining function is activated, then the system locks the object group so that a list of classes belonging to the object group and the active version can be prevented from being changed. Then, the following operations are performed recurrently.

R1: The name of a specified object and the ID (normally represented by a version number) of the active version are extracted.

R2: A list of objects related to a specified object is retrieved.

R3: An environment information obtaining function is applied to each of the obtained objects.

The extracted information is stored in the object which is newly defined to realize the function and stores the environment information.

The above described method obtains the information about a single object and the related objects only. To store the environment of the entire object group, the above mentioned procedure should be applied to each of the objects in the group.

The environment storing process is performed by the environment information obtaining function in the following order.

U1: An environment storage ID is obtained.

The ID is a number uniquely assigned in the system. Thus, the ID corresponds one-to-one to the environment.

U2: A specified object is obtained and the version number of the object being used is stored together.

U3: A list of objects associated with the version of the specified object being used is obtained.

U4: An environment storage function is applied to each object using the ID obtained in U1.

The environment can be reproduced by reading the stored information one by one in object units and changing a version of each object under operation.

Figure 15:
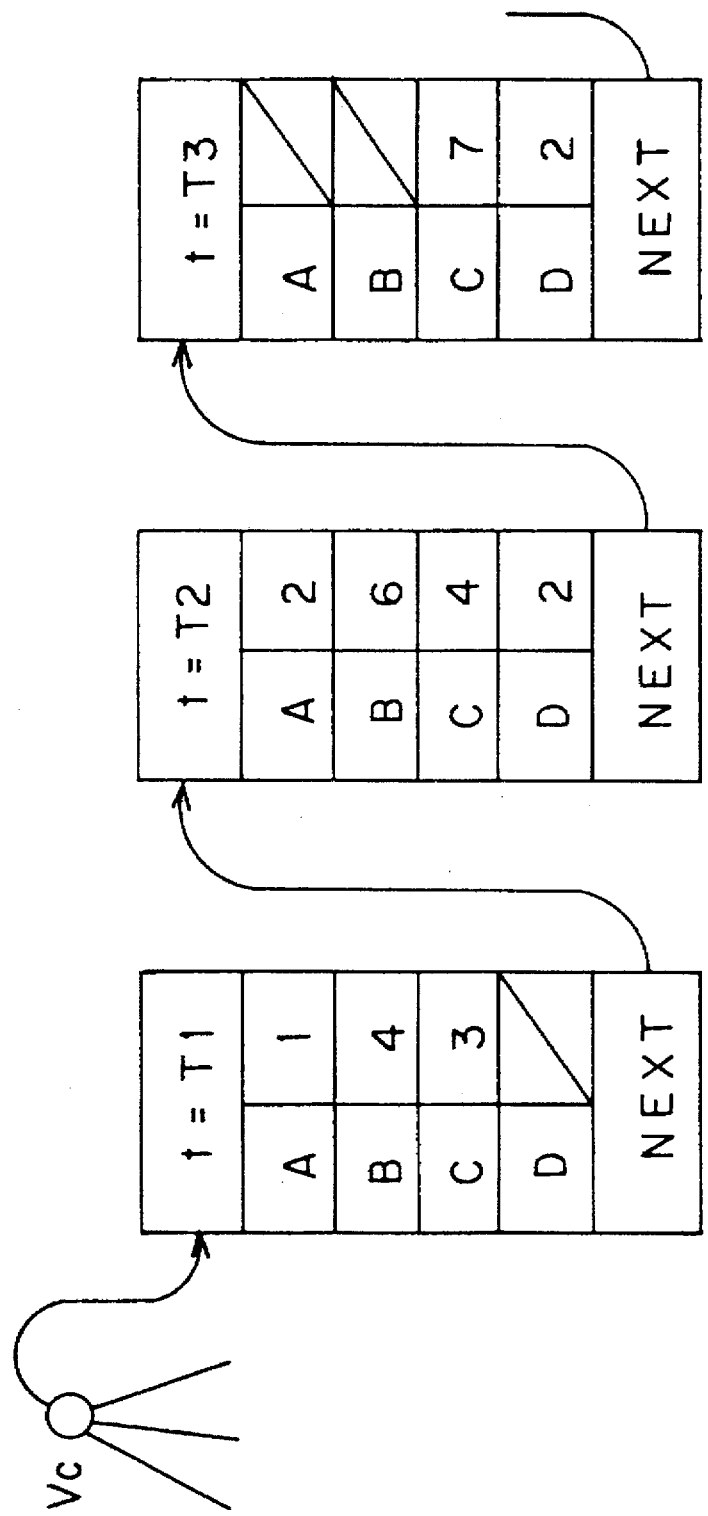
FIG. 15 shows a practical example of the environment information.
Figure 16:
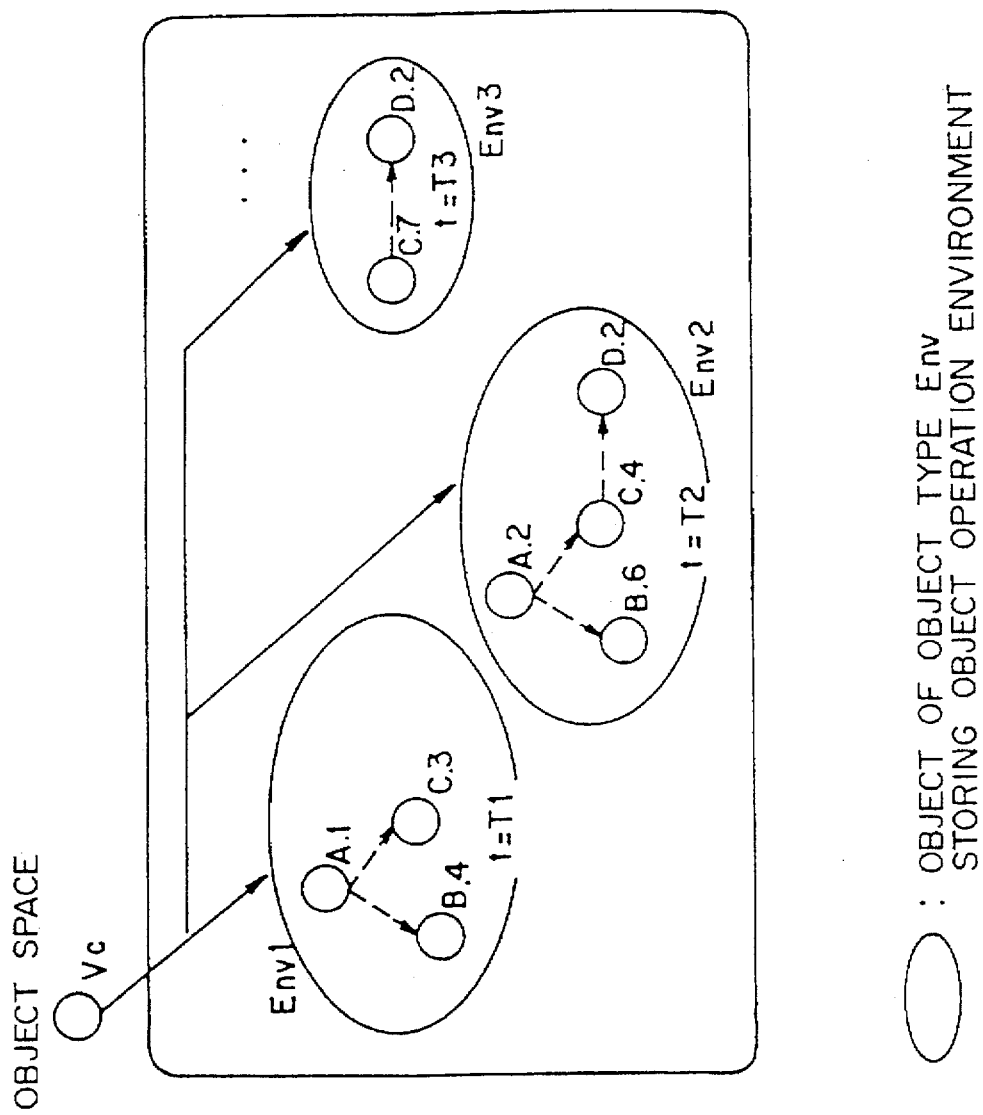
FIG. 16 shows the position in a object space for an object newly defined to store environment information.

FIG. 15 shows a practical example of the environment information. In FIG. 15, the versions of objects A, B, C, and D to have been processed at time t=T1, T2, T3, ... are stored in a table format. One of these tables is pointed to by object Vc for storing the information common to the object groups in the entire system. FIG. 16 shows in an object space the relationship between object Vc and objects Env1, Env2, and Env3 newly defined to store the environment information shown in FIG. 15. In this example, the influence of the environment is effective only within the object group managed by object Vc.

The sixth important feature of the present invention is to store a version of data under the application of the version control function in a format of data which are not under the application of the version control function. The feature is very effective when a data access efficiency should be improved.

The version control function recognizes the existence of plural pieces of data having the same name among data under the application of the version control function. In the system, it is common that some change, e.g. a renaming operation is made on data. If a version of data is required to be processed, then the data should be converted to the original data type. The conversion is described later in detail. The converting operation can be omitted when one of data having the same name is under operation by storing at least the one of data as it is.

This function is especially effective when the frequency of the change of the versions of data is not so high. With this function, a version specified by a predetermined method is stored as A with a higher priority instead of performing the same operation on data objects A[1], A[2], ... as the same type. For example, only a default version is stored as A by priority.

This function is realized by first performing a conditional determination instead of equally processing objects.

Figure 17:
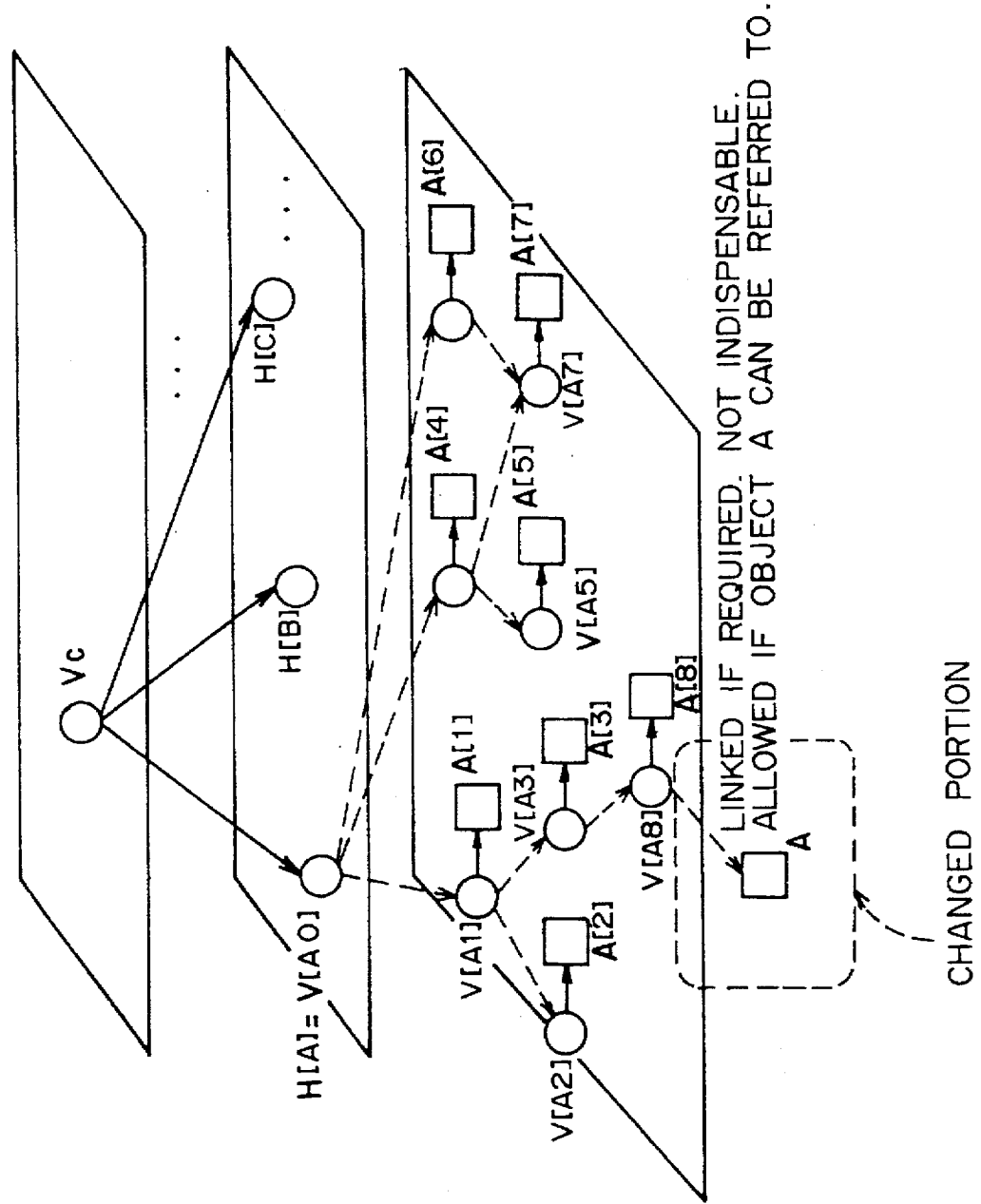
FIG. 17 shows current active version as class A in an object space.

If the latest object version having the highest utilization should be stored in the original format of the data object, then FIG. 8 is changed as shown in FIG. 17.

FIG. 17 shows that the active version of class A is No. 8. The latest version of class A is version 8, and class A has versions A[1] through A[8]. Additionally, class A has object A which is equivalent to A[8] in FIG. 17.

Figure 18:
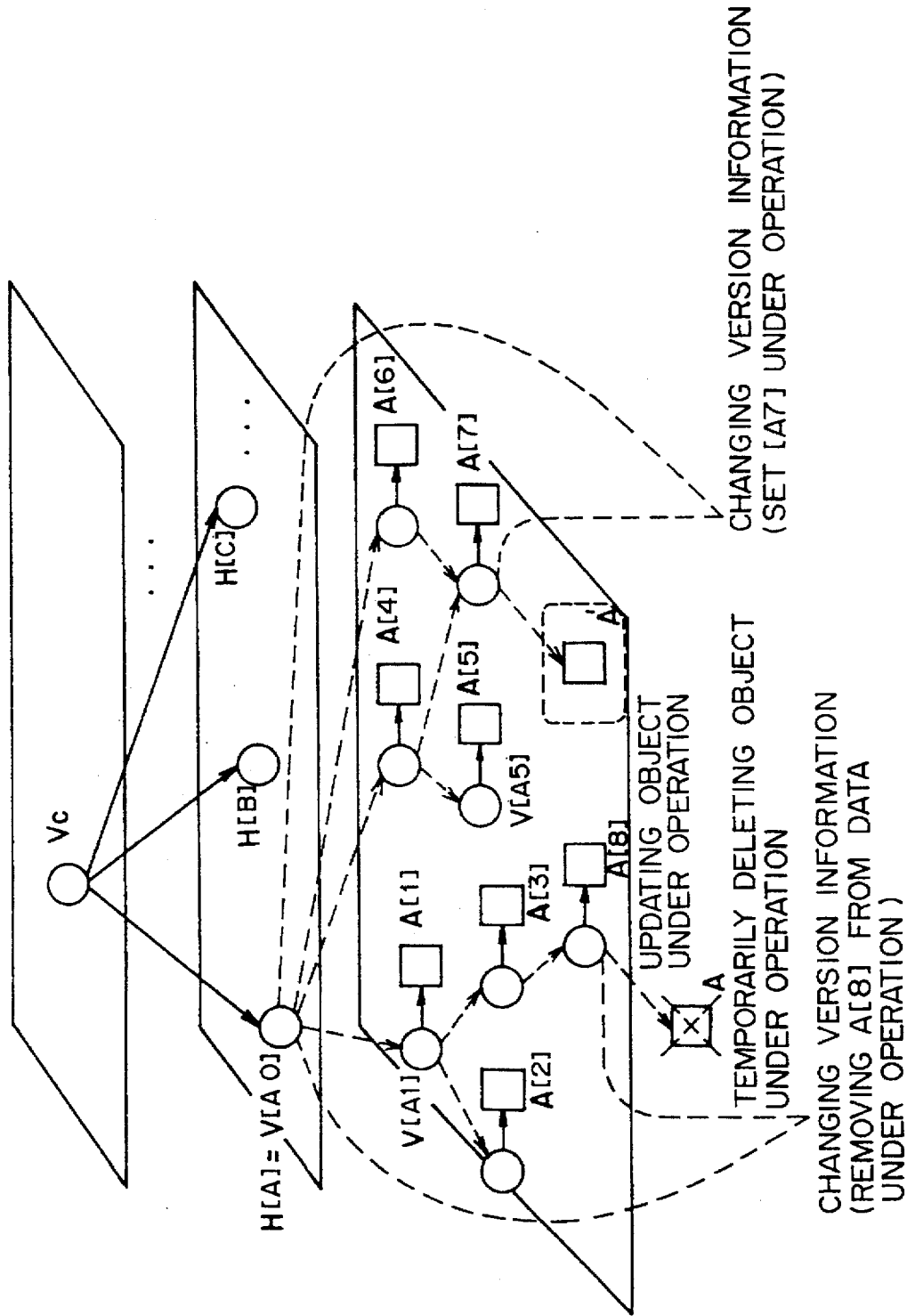
FIG. 18 shows the change of an object to be processed.

The main object of the version control function, that is, a change of an object under operation, is performed as shown in FIG. 18.

An active version is changed as follows.

W1: The object under operation at present is deleted.

In FIG. 18, object A (version 8 is selected) is temporarily deleted.

W2: The information about the object under operation at present is cleared and the information about the version newly set under operation (version 7, for example) is added.

The slot value storing the version number of the object under operation in Historical object H [A] is changed. Also changed is the value of the flag indicating whether or not the version in version object A[n] is active at present (in this case, only A[8] and A[7] are changed).

W3: An object to be processed is created using the version newly set under operation.

Object A (A' in FIG. 18) is newly created using a new version of object A (A[7] in this example).

Described below is the conversion to an original data type at the time of a request for data. In a system in which the version control function is not provided, it is not possible to store a plurality of versions of an object. That is, the system cannot store a plurality of objects considered to be the same. Thus, all objects in the system are recognized as different from one another.

Therefore, if the version control function is additively provided, that is, if a plurality of objects externally recognized as being the same are stored in a system, the data should be converted to be recognizable as being different in the system.

For example, a plurality of objects A recognized as being existing by the version control function are renamed into A.1, A.2, A.3, . . . ,, etc. Or, for example, objects VS.a1, VS.a2, etc. each having the information about object A and being represented in the same format are created and store information therein.

Therefore, when version.3 of object A is active and then version.2 of object A is to be made active, it is needed to be determined where the information about version.2 of object A is stored (for example, A.2, VS.a1, etc. are extracted at this time). The information must be restored to the format of A.

Thus, the data (stored in A.2 or VSa2) of a required version (version.2 of A) are converted to the original data type (A) when it is requested.

If there are a plurality of documents titled, for example "Specification", then it cannot be determined which is the required specification among the documents.

To store in a system plural pieces of the same information, they should be changed such that they could be discriminated from one another.

The first applicable method is to rename an object, that is, A is renamed into A.1, A.2, A.3, . . . For example, Specification is changed into Specification 1, Specification 2, and the like. In this case, the contents of the specification are not modified at all and a plurality of specifications can be stored and extracted when required.

The second method is to convert different data into the same format and assign them respective object identifiers. In this case, object VS has a plurality of versions VS.a1 and VS.a2 having different identifiers. This indicates that an object VS has its information storage format and contains information versions 1 and 2 of A. For example, the above mentioned Specification is converted into "Document describing the contents of Specification 1", "Document describing the contents of Specification 2", and the like. In this case, the contents are also converted depending on the document format, for example "the document name is Specification and the document is composed of four chapters, the first chapter being as follows . . . ", "the document name is Specification and the document is created by converting the third chapter of 'Document describing the contents of the Specification 1' as follows . . . ", etc.

Generally, in the second method, a larger amount of data must be converted than in the first method and therefore takes a longer operation time. However, the second method does not store the information about the entire versions, but stores only difference information ("the document is created by converting the third chapter of 'Document describing the contents of the Specification 1' as follows . . . " as described above). Therefore, it has the effect of storing the entire information and can be very effective when a DB not having a large storage capacity is used.

The seventh important feature of the present invention is to reduce the number of divisions of the version-related information described in the general descriptions of the present invention. For example, the number is reduced to two from three. In FIG. 1, the version-related information required to realize the version control function is divided into three types depending on their functions, and the obtained version-related information divisions are stored in three types of objects. Instead, the information can be stored in one or two types of objects.

The function is especially effective when an increased number of objects badly affect the system performance.

Although the version-related information may not be completely divided in this method, the number of objects provided to realize the version control function can be reduced to attain this purpose sufficiently.

Generally, the information about a data (object) group can be a list of objects under the application of the version control function. If the list of the objects under the application of the function can be obtained by any other method, then required are no objects for storing the information about the data (object) group.

Figure 19:
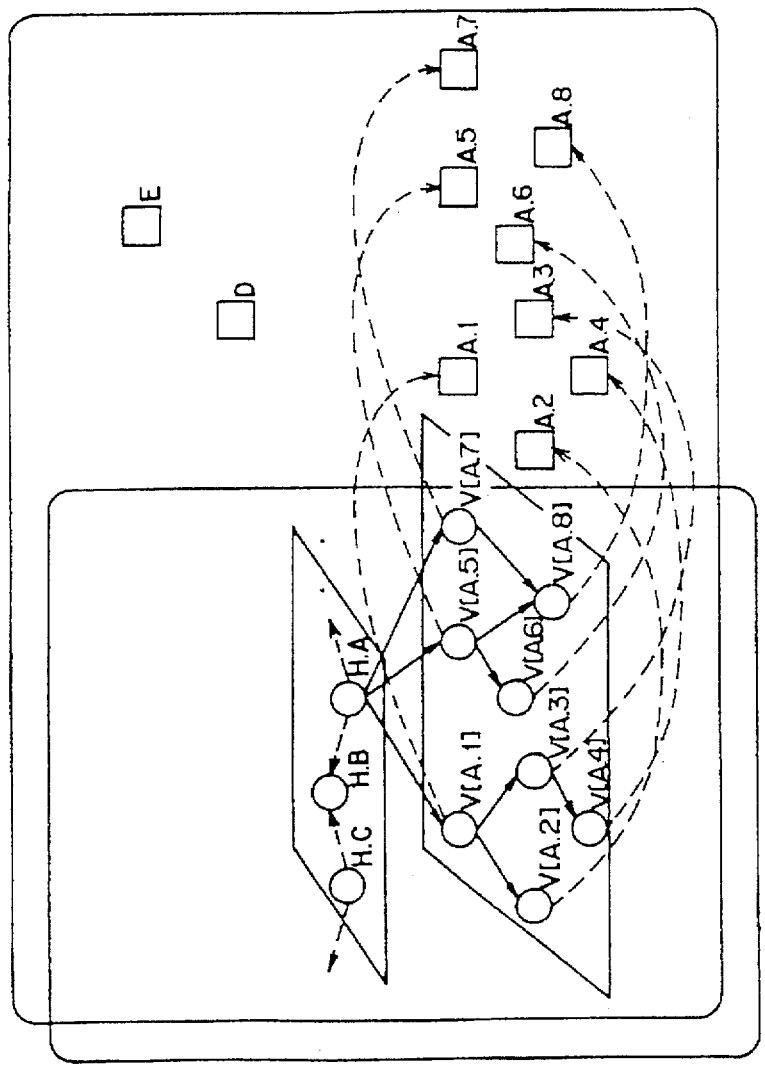
FIG. 19 shows the version control function having two-layer version control information.

For example, if only a single object group exists, then the version-related information managed as shown in FIG. 9 can be managed after being changed in structure as shown in FIG. 19.

FIG. 19 shows a variation of a model of the version control function having two levels. A list of objects under the application of the version control function can be obtained through the links stored in object H for storing the version-related information specific to the objects under the application of the version control function. The list can be a substitute for object Vc which stores the information about an object group.

The eighth important feature of the present invention is to divide the version-related information into more than three levels contrary to the seventh feature. That is, the version-related information required to realize the version control function is divided into four or more levels for respective roles. Each division is stored in each of different types of objects.

In the general descriptions of the present invention, the version-related information is managed after being divided into three levels, that is, a data group, data under the application of the version control function, and a specified version of the data under the application of the version control function. By contrast, the information is divided into a further more levels to manage the version-related information.

Figure 20:
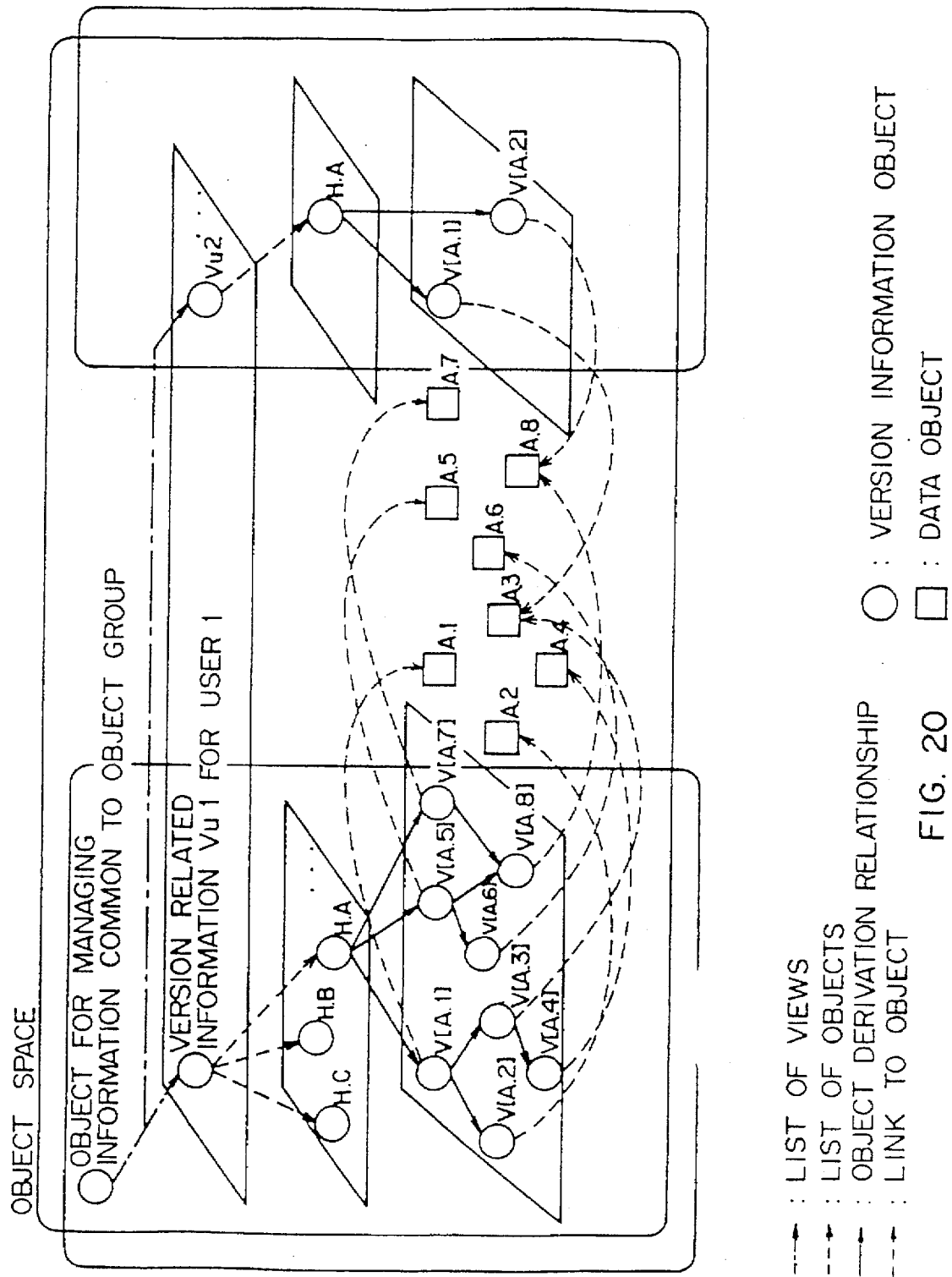
FIG. 20 explains the version control function having four-layer version control information for multiple users.

FIG. 20 shows a multi-user application of the present invention as an example of dividing the version-related information into four or more levels as the eighth feature of the present invention. FIG. 20 shows an example of the case where the version-related information is divided into four levels for management.

In FIG. 20, the version-related information about the same object group is divided and managed by an object for managing the information common in the object group and by objects Vu1, Vu2, etc. for managing the information for each user. In FIG. 9, the definition of a version is the same in an object group. For example, version.3 of object A for a user is also version.3 for another user. However, in a development and a trial stage, a user does not have to recognize a version the same way as another user.

In FIG. 20, user 1 recognizes all versions of A, while user 2 recognizes only version.3 and version.8 recognized by user 1 as version.1 and version.2 of A respectively. This case is an example when user 1 develops object A, and user 2 only use objects.

The present invention divides required version control information into hierarchical levels to realize the version control function. Fundamentally, the information is divided into three levels because a dividing into three levels, that is, an object under the application, a specified version, and an object group of objects under the application is the most common.

By Contrast, according to the present embodiment, the number of levels is incremented to multiple layers (three or more) with the version-related information stored and managed after being hierarchically divided depending on the influence of information.

As described above, a specific data can be selected from a plurality of alternatives, another alternative can be reselected, and the data of old version used previously can be used again through a single version managing mechanism according to the present invention.

Furthermore, according to the present invention, the version control function can be kept independent from the system under the application of the function, and a system which has never be provided with the version control function can be additively provided with the function by managing a version with the version-related information separated from data under the application of the version control function. Furthermore, various applications such as adding user-defined functions, user-customization, and the utilization by multiple users can be realized.

Additionally, a single version control device or a method can realize the version control function performed on a plurality of data of different levels, for example the version control function applied to a single data, and the version control function applied to a data group or a schema.

What is claimed is:

1. A version control device operated in an object-oriented data base system operable for storing and processing object-oriented data, comprising:

entire-generic information storage object means for storing and managing a first version control information common to all of at least one of object-oriented data under a version control;

version-generic information storage object means, managed by said entire-generic information storage object means, for storing and managing a second version control information corresponding to each of said at least one of object-oriented data and common to all of a plurality of versions of each of said at least one of object-oriented data;

a plurality of version-specific information storage object means, managed by said version-generic information storage object means, for storing and managing a third version control information corresponding to each of said plurality of versions of said at least one of object-oriented data and specific to each of said plurality of versions; and means for maintaining a specific version of one of data among said at least one of object-oriented data in a state without an application of a version control in the object-oriented database system.

2. The version control device according to claim 1, further comprising:

storage means for storing said at least one of object-oriented data and the version control information stored in said entire-generic information storage object means, said one version-generic information storage object means, and said plurality of version-specific information storage object means;

converting and restoring means for converting a first data format used in an input/output operation for said object-oriented data base system to a second data format of the object-oriented data, and restoring the second data format to the first data format; and data specifying means for specifying data to be converted and restored by said converting and restoring means.

3. The version control device according to claim 1, wherein a type of said at least one of object-oriented data is one of a given type, a composed type of given data types, and an inclusive type of data including data of another type; and said version control device performs said version control on data of the given type, the composite type, and the inclusive type through a common operation.

4. The version control device according to claim 1, wherein a type of said at least one of object-oriented data is one of schema, class, and instance; and said version control device performs said version control on the schema, class, and instance through a common operation.

5. The version control device according to claim 1, wherein said version-generic information storage object means stores version-related information indicating that a new version has been generated from at least one existing version of said at least one of object-oriented data.

6. The version control device according to claim 1, wherein one of said plurality of version-specific information storage object means corresponding to at least one of existing version stores version-related information indicating that a new version has been generated from said at least one existing version of said at least one of object-oriented data.

7. The version control device according to claim 1, wherein one of said plurality of version-specific information storage object means corresponding to a newly generated version stores version-related information indicating that said newly generated version has been generated from at least one existing version of said at least one of object-oriented data.

8. The version control device according to claim 1, wherein an object affecting a related object can be changed on condition that a data consistency can be maintained in the related object in said object-oriented data base system.

9. The version control device according to claim 1, further comprising:

a checker means for operating at a predetermined timing and checking a data consistency in a related object related to a certain object in said object-oriented data base system, said checker means checking the data consistency in the related object if a change on the certain object is planned and removing a data inconsistency according to a predetermined procedure if the data inconsistency has been detected in a check.

10. The version control device according to claim 9, wherein said checker means comprises:

consistency condition storage means for storing a condition for the data consistency;

restoration restriction storage means for storing the predetermined procedure for removing the data inconsistency;

inconsistency retrieving means for checking the data consistency at the predetermined timing using the condition for the data consistency stored in said consistency condition storage means;

restoration restriction executing means for trying to remove the data inconsistency using the predetermined procedure stored in said restoration restriction storage means if said inconsistency retrieving means has detected the data inconsistency; and verifying means for verifying the data consistency in response to a data inconsistency removal result input by said restoration restriction executing means.

11. The version control device according to claim 1, further comprising in said object-oriented data base system:

version environment storage object means for storing a name of the object-oriented data pointed to by said entire-generic information storage object means and used at a specified time and a version number of a version of the object-oriented data being used at the specified time, wherein said version control device is operable to recognize the name of the object-oriented data and the version of the object-oriented data used at the specified time by referring to said version environment storage object means, and to reproduce an operation state at the specified time.

12. The version control device according to claim 1, wherein information stored in said entire-generic information storage object means, said version-generic information storage object means, and said version-specific information storage object means is stored and managed separately in at most two remaining object means in the object-oriented data base system.

13. The version control device according to claim 12, further comprising a plurality of version-generic information storage object means, and wherein said version control information is managed at two levels by storing in all of said plurality of version-generic information storage object means information to be stored in said entire-generic information storage object means so that all of said plurality of version-generic information storage object means can be linked to one another.

14. A version control device operable for storing and processing object-oriented data in an object-oriented data base system, comprising:

a plurality of object means for storing and managing version control information about at least one of object-oriented data under version control, derivative data among said at least one of object-oriented data being not originally provided with version control, said version control information being separated from said at least one of object-oriented data and divided hierarchically by said plurality of object means; and means for maintaining a specific version of the derivative data among said at least one of object-oriented data in a state without application of version control in the object-oriented database system.

15. The version control device according to claim 14, wherein said plurality of object means include entire-generic information storage object means for storing and managing version control information common to said at least one of object-oriented data, at least one user common information storage object means, managed by said entire-generic information storage object means, for storing and managing version control information corresponding to at least one user of said object-oriented data base system and common to at least one of object-oriented data used by each user of said at least one user, at least one version-generic information storage object means, managed by said at least one user common information storage object means, for storing and managing version control information corresponding to each of said at least one of object-oriented data used by said each user and common to all of plurality of versions of each of said at least one of object-oriented data used by said each user; and a plurality of version-specific information storage object means, managed by said at least one version-generic information storage object means, for storing and managing version control information corresponding to each of said plurality of versions of each of said at least one of object-oriented data used by said each user and specific to each of said plurality of versions.

16. A version control method for managing a version of object-oriented data, comprising the steps of:

storing a first version control information common to at least one of object-oriented data under a version control;

storing a second version control information corresponding to each of said at least one of object-oriented data and common to a plurality of versions of said at least one of object-oriented data;

storing a third version control information corresponding to each of the plurality of versions of each of said at least one of object-oriented data and specific to each of said plurality of versions;

managing versions of said at least one of object-oriented data using the first version control information common to said at least one of object-oriented data, the second version control information common to said plurality of versions, and the third version control information specific to each of said plurality of versions; and allowing a possibility of a specific version of one of data among said at least one of object-oriented data to be in a state without an application of a version control.

17. A version control method for managing a version of object-oriented data, comprising the steps of:

hierarchically dividing version control information relating to and separated from at least one of object-oriented data under version control, derivative data among said at least one of object-oriented data being not originally provided with version control;

storing the version control information;

managing a version of said at least one of object-oriented data using the version control information; and allowing a possibility of a specific version of derivative data among said at least one of object-oriented data to be in a state without application of version control.

18. A version control device operable for storing and processing object-oriented data in an object-oriented data base system, comprising:

a plurality of object means for storing and managing version control information about at least one of object-oriented data under version control, said version control information being separated from said at least one of object-oriented data and divided hierarchically by said plurality of object means;

version environment storage object means separated from said at least one of object-oriented data, for storing information of a specified time, a name of selected object-oriented data pointed to by one of said plurality of object means and used at the specified time, and a version number of a version of the selected object-oriented data used at the specified time; and means for recognizing the name of the selected object-oriented data and the version of the object-oriented data used at the specified time by referring to said version environment storage object means and for reproducing an operation state at the specified time.

19. A version control method for managing a version of object-oriented data, comprising the steps of:

hierarchically dividing version control information relating to and separated from at least one of object-oriented data under version control;

storing the version control information;

managing a version of said at least one of object-oriented data using the version control information;

storing version environment information separated from said at least one of object-oriented data and including information of a specified time, a name of selected object-oriented data pointed to by the version control information and used at the specified time, and a version number of a version of the selected object-oriented data used at the specified time;

recognizing the name of the selected object-oriented data used at the specified time by referring to said version environment information; and reproducing an operation state at the specified time.

* * * * *